HEXAHYDROAZEPINES

John Frederick Cavalla, Isleworth, and Alan Chapman White, Windsor, England, assignors to John Wyeth & Brother Limited, Taplow, Maidenhead, England
No Drawing. Continuation-in-part of application Ser. No. 848,080, Aug. 6, 1969, now abandoned. This application Feb. 3, 1971, Ser. No. 112,443
Int. Cl. C07d 41/04
U.S. Cl. 260—239 B                          6 Claims

ABSTRACT OF THE DISCLOSURE

A new group of substituted hexahydroazepines useful as analgesics is described. These compounds are substituted at either position 3 or 4 by a lower alkyl group and a m-oxygenated phenyl radical (such as m-hydroxyphenyl, m - methoxyphenyl, m - benzyloxyphenyl, or m-acyloxyphenyl), optionally substituted at position 2 by a lower alkyl radical, and optionally substituted at position 1 by lower alkyl, lower alkenyl, lower alkynyl, cyclopropylmethyl, lower alkanoyl, or by ring-substituted or unsubstituted phenethyl, phenacyl, or β-benzoylethyl.

---

This invention relates to novel hexahydro-1H-azepine derivatives, to processes for their preparation and to pharmaceutical compositions containing them. This application is a continuation-in-part of our copending application Ser. No. 848,080 filed Aug. 6, 1969, now abandoned.

Compounds containing an azepine ring have been known for some time to have pharmaceutical activity, particularly analgesic activity. For example one well-known non-addictive analgesic of this type on the market is ethyl 1 - methyl-4-phenyl-hexahydroazepine-4-carboxylate which is known as ethoheptazine. We have now found that a new series of hexahydroazepines, which are substituted at either position 3 or 4 by both a lower alkyl group and a phenyl radical substituted at the meta position by an oxygen-containing substituent such as hydroxy, lower alkoxy, benzyloxy or lower alkanoyloxy generally exhibit pharmaceutical activity, more specifically analgesic activity or analgesic antagonism. Some of the compounds, in particular that of Example 34, show a novel but highly interesting combination of analgesic and analgesic antagonistic activities. Furthermore, some of the novel compounds of the invention can be used as intermediates in the preparation of similar compounds.

The novel compounds provided by the invention are hexahydroazepine derivatives of the general formula

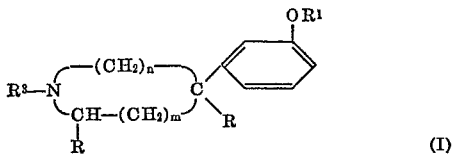

(I)

and acid addition and quaternary ammonium salts thereof, in which $R^1$ is a hydrogen atom, a lower alkyl radical, a benzyl radical or a lower alkanoyl radical, $R^2$ is a lower alkyl radical, $R^3$ is a hydrogen atom, a lower alkyl, alkenyl, alkynyl, cyclopropylmethyl, lower alkanoyl, alkoxycarbonyl, formyl, phenacyl or phenethyl group which may be substituted in the benzene ring or β-benzoylethyl radical which may be substituted in the benzene ring, $n$ is the integer 3 or 4, $m$ is 0 or the integer 1 with the proviso that $n+m$ is always equal to 4, R is a hydrogen atom or lower alkyl radical when $m$ is 0 or a hydrogen atom only when m is the integer 1, and the term "lower" means that the radical contains up to 6, preferably up to 4 carbon atoms.

When R is a hydrogen atom, there is only one asymmetric carbon atom in the molecule, and so the invention provides both optically active isomers as well as the racemate, but when R is a lower alkyl radical there are two asymmertic carbon atoms and the invention provides all the optical isomers as well as the racemates. If an optically active isomer is desired, then a resolution can be carried out using methods known per se.

When $n$ is 3 and $m$ is 1, the compounds are 1,4,4-trisubstituted hexahydroazepines of general Formula II, and when $n$ is 4 and $m$ is 0 the compounds are 1,2,3,3-tetrasubstituted hexahydroazepines of general Formula III, wherein R, $R^1$, $R^2$ and $R^3$ have the meanings defined above.

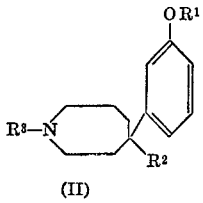   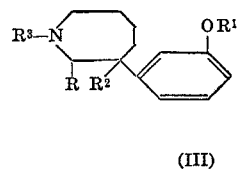

(II)                                    (III)

We have named the compounds of the above general formulae using the hexahydro-1H-azepine ring as the basic unit and numbering from the nitrogen atom of this ring. Examples of such compounds are:

3-(m-methoxyphenyl)-1-methyl-3-propylhexahydro-1H-azepine,
3-(m-methoxyphenyl)-1,3-dimethylhexahydro-1H-azepine,
3-(m-hydroxyphenyl)-1-methyl-3-propylhexahydro-1H-azepine and
3-(m-hydroxyphenyl)-1,3-dimethylhexahydro-1H-azepine, though it is realised that the last two compounds could alternatively be named using phenol as the basic unit. For example, the last compound could be named according to Chemical Abstracts nomenclature as m-(hexahydro-1,3-dimethyl-1H-azepin-3-yl)phenol.

Preferred compounds of the above general Formulae II and III are hexahydro-1H-azepines in which R is hydrogen or methyl, $R^1$ is hydrogen, methyl or acetyl, $R^2$ is methyl, ethyl, n-propyl, iso-propyl or n-butyl and $R^3$ is hydrogen, methyl, ethyl, n-propyl, allyl, 3-methylbut-2-enyl (i.e. commonly known as dimethylallyl), propynyl, cyclopropylmethyl, phenacyl, phenethyl, p-aminophenethyl, β-benzoylethyl β-(p-chlorobenzoylethyl), ethoxycarbonyl or formyl.

Compounds of the above general Formula I in which $R^1$ is other than lower alkanoyl, and $R^3$ is other than hydrogen or a lower alkanoyl radical can be prepared by "alkylating," as hereinafter defined, a compound of the general formula

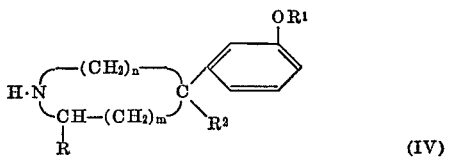

(IV)

The term "alkylating" as used herein means introducing onto the nitrogen atom of the hexahydroazepine ring a radical $R^3$ selected from alkyl, alkenyl, alkynyl, cyclopropylmethyl, phenacyl, phenethyl (which may be substituted in the benzene ring) or β-benzoylethyl (which may be substituted in the benzene ring) radicals. Many methods of alkylating compounds are known and the most suitable method to give a desired product can be used, the following methods generally being preferred.

A compound of general Formula IV in which $R^1$ is other than lower alkanoyl can be reacted with an alkyl halide of the general formula $$R^3—Hal$$

(where $R^3$ has the meanings defined in col. 1, but is other than lower alkanoyl or formyl, and Hal is a halogen atom) in the presence of an acid acceptor such as an alkali metal carbonate (e.g. potassium carbonate) preferably in solution in an organic solvent at, e.g. 25°–100° C., preferably, 80–100° C.

A 1-methyl group can be introduced into a compound of general Formula IV in which R, $R^1$, $R^2$, $n$ and $m$ have the meanings defined in col. 1, by reductive methylation, for example, using formaldehyde and hydrogen in the presence of a hydrogenation catalyst.

Furthermore, the compounds of general Formula I in which $n$ is 4, $m$ is 0, $R^1$ is an alkyl or benzyl radical, $R^2$ is a lower alkyl radical, $R^3$ is lower alkyl, alkenyl, alkynyl, cyclopropylmethyl, phenethyl and R is a hydrogen atom can be prepared by alkylating a hexahydro-2H-azepin-2-one of the general formulae

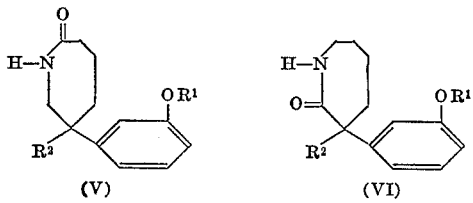

and reducing the oxo group to a methylene group. For example the hexahydro-2H-azepin-2-one may be converted to an alkali metal salt (e.g. by reaction with sodium, sodamide or sodium hydride), the alkali metal salt reacted with a halide of the general formula $$R^3—Hal$$

wherein $R^3$ is lower alkyl, alkenyl, alkynyl, cyclopropylmethyl or phenethyl, and the 1-alkylated hexahydro-2H-azepin-2-one subsequently reduced.

Compounds of the general Formula I in which $R^1$ is other than hydrogen and $R^3$ is a lower alkanoyl radical, can be prepared by acylating a corresponding compound of the general Formula IV in which $R^1$ is other than hydrogen.

Compounds of the general Formula I in which $R^3$ is a formyl radical, can be prepared by formylating a corresponding compound of the general Formula IV. Of the many methods which are known for formylation, it is preferred to heat under reflux a compound of Formula IV with formic acid.

Compounds of the general Formula I in which $R^1$ is lower alkanoyl can be prepared by acylating a corresponding compound in which $R^1$ is hydrogen.

The compounds of general Formula I in which R, $R^2$, $R^3$, $n$ and $m$ have the meanings already defined and $R^1$ is a hydrogen atom can be obtained from the corresponding compounds of general Formula I in which $R^1$ is lower alkyl or benzyl by splitting the ether group in known manner, e.g. by treating the lower alkyl or benzyl ethers with hydrogen bromide or boron tribromide or by subjecting the benzyl ethers to hydrogenolysis. If desired, the product obtained can then by acylated (e.g. with acetic anhydride) to give the corresponding compound in which $R^1$ is a lower alkanoyl radical.

A preferred method for the preparation of compounds of general Formula III in which R is hydrogen is illustrated below. In this method, $R^2$ and Hal have the meanings defined above, $R^1$ is lower alkyl and Alk is a lower alkyl radical which preferably is ethyl.

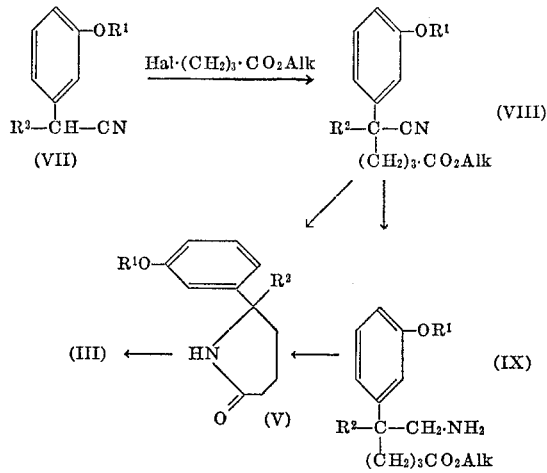

A substituted aliphatic nitrile of Formula VII can be reacted with sodium in liquid ammonia followed by an alkyl halobutyrate (preferably ethyl 4-iodobutyrate) to give a nitrile-ester of Formula VIII; this nitrile ester can be reduced, (e.g. preferably with hydrogen in the presence of palladium on charcoal at room temperature in a solvent such as methyl alcohol containing sulphuric acid, and under a pressure of about 50 lbs./sq. inch, or with hydrogen in the presence of Raney nickel at temperatures of 100–150° C. in a solvent such as cyclohexane and under pressures of 800 to 1200 lbs./sq. inch). Low temperatures tend to give the open chain product of Formula IX, while higher temperatures tend to give the product of Formula V; accordingly, the product of Formula IX can be heated (e.g. in a solvent, such as refluxing toluene or decahydronaphthalene or with sodium ethoxide in absolute alcohol) to give the hexahydro-2H-azepin-2-one of Formula V which can be reduced (e.g. with sodium dihydro-bis-(2-methoxyethoxy)-aluminate or with lithium aluminium hydride) to give a compound of Formula III wherein R and $R^3$ are hydrogen, or can be "alkylated" directly with subsequent reduction to give a hexahydroazepine of general Formula III wherein R is hydrogen and $R^3$ is lower alkyl, alkenyl, alkynyl, cyclopropylmethyl or phenethyl.

Once a compound of Formula III in which $R^1$ is lower alkyl has been prepared the corresponding compound in which $R^1$ is hydrogen can be obtained therefrom by splitting the ether group following the information given above.

A less preferred method for the preparation of compounds of general Formula III in which R and $R^3$ are hydrogen is next illustrated. In this method $R^1$ can be lower alkyl or benzyl radicals.

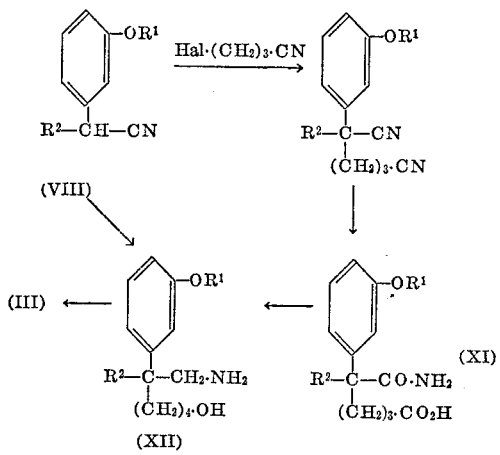

A substituted aliphatic nitrile of Formula VII can be reacted in a similar manner to that of the previous method, but using, for example, 4-iodobutyronitrile to give a dinitrile of Formula X, which on hydrolysis (e.g. with an aqueous alkali metal hydroxide) gives the amido-acid of Formula XI; the amido-acid can be reduced (e.g. with lithium aluminium hydride) to the aminohydroxy compound of Formula XII which may be halogenated (e.g. with thionyl chloride) and then cyclised in the presence of a base (e.g. an alkali metal carbonate) to give the desired compound of Formula III. As a modification of this route, a compound of Formula VIII may be reduced (e.g. with lithium aluminium hydride) to a compound of Formula XII.

The following three methods can also be used for the preparation of compounds of the general Formula III in which R is a hydrogen atom. In the first and third method $R^1$ is a lower alkyl radical, whereas in the second method $R^1$ can also be a benzyl radical.

(A)

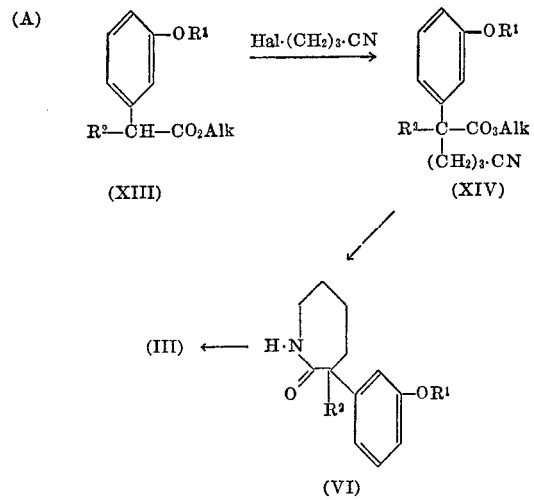

One can start with a substituted aliphatic ester of Formula XIII and react it with, for example, sodium in liquid ammonia followed by 4-iodobutyronitrile to give the nitrile ester of Formula XIV; the nitrile ester may be cyclised as described in the preferred method above, to give the hexahydro-2H-azepin-2-one of Formula VI which may be reduced to give a compound of Formula III wherein R and $R^3$ are hydrogen, or "alkylated" with subsequent reduction to give a compound of Formula III wherein R is hydrogen and $R^3$ is lower alkyl, alkenyl, alkynyl, cyclopropylmethyl or phenethyl.

(B)

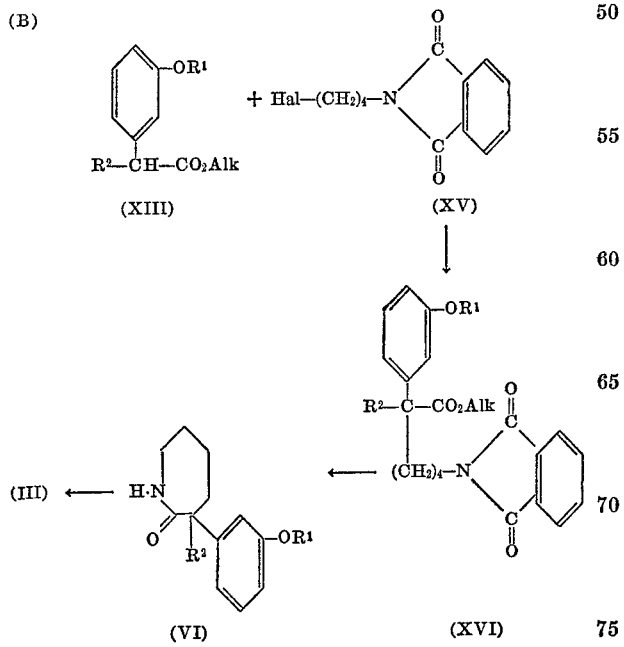

A substituted aliphatic ester of Formula XIII is reacted with, for example, N-(4-iodobutyl)phthalimide of Formula XV to give a compound of general Formula XVI which can be cyclised, after removal of the phthaloyl protecting group, to give a compound of Formula VI. Reduction of (VI) gives compounds of Formula III wherein R and $R^3$ are hydrogen, or alkylation of (VI) followed by reduction gives compounds of Formula III wherein R is hydrogen and $R^3$ is lower alkyl, alkenyl, alkynyl, cyclopropylmethyl, or phenethyl.

(C)

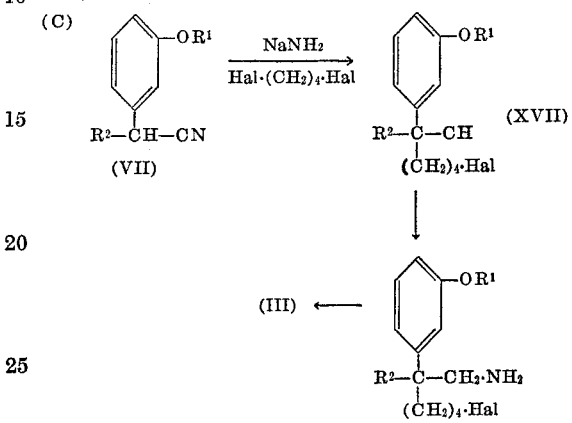

A substituted aliphatic nitrile of Formula VII is converted to an alkali metal derivative thereof (for example, by reaction with an alkali metal amide) and then reacted with a dihalo-butane (for example, 1-bromo-4-chlorobutane) to give the halo-nitrile of Formula XVII. Reduction of this to the halo-amine is effected by catalytic hydrogenation, which in turn is cyclised to compounds of general Formula III by heating in a suitable solvent.

If the hexahydroazepine obtained by any of the above methods is not that desired, then it can optionally be treated in any of the ways hereinbefore or hereinafter described to give the one desired.

A preferred method of preparation of a component of general Formula III in which R is a lower alkyl radical, $R^1$ is a lower alkyl or benzyl radical and $R^3$ is a hydrogen atom is given below

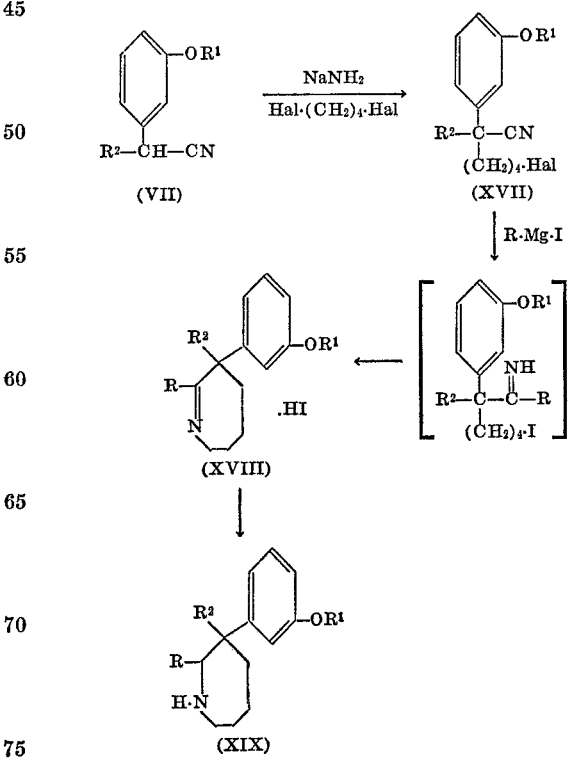

As can be seen, a compound of general Formula VII, which may be prepared by methods known in the art, is converted to an alkali metal derivative thereof (e.g. by reaction with an alkali metal amide) and then reacted with a dihalo-butane (e.g. 1-bromo-4-chlorobutane) to give a compound of general Formula XVII. Cyclisation of this compound to the unsaturated compound of general Formula XVIII can be effected through reaction with a Grignard reagent. Subsequent reduction yields a compound of general Formula III in which $R^3$ is hydrogen i.e. a compound of Formula XIX. If the hexahydroazepine produced by this method is not that desired, then it can optionally be treated in any of the ways hereinbefore or hereinafter described to give the one desired.

The compounds of general Formula II, wherein $R^1$ is a lower alkyl radical and $R^3$ is other than hydrogen, can be prepared by reducing a hexahydro-1H-azepine of the general formula

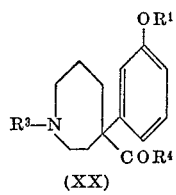

(XX)

(where $R^1$ and $R^3$ have the meanings defined above and $R^4$ is a hydrogen atom or an alkyl radical containing 1 to 5 carbon atoms). The reduction may for example be carried out by heating with hydrazine in an alkaline solution, (for example, in the presence of an alkali metal hydroxide) in an organic solvent, such as diethylene glycol. Other methods of reduction which are known per se for reducing a keto group to a methylene group can be used, and examples are (a) reaction of the compound of general Formula II with ethanedithiol followed by hydrogenolysis of the mercaptal group in the presence of Raney nickel or (b) reaction of the compound of general Formula II with p-toluenesulphonyl hydrazine followed by reduction, for example, with sodium borohydride or lithium aluminium hydride.

A compound of general Formula II in which $R^1$ is a lower alkyl radical and $R^3$ is a methyl radical may be demethylated at the nitrogen atom to give the corresponding compound in which $R^3$ is hydrogen. For example, demethylation may be carried out using cyanogen bromide or ethyl chloroformate. If desired, this product may be converted to another compound of the same general formula by any of the methods hereinbefore described.

The starting materials of general Formula XX in which $R^4$ is an alkyl radical containing 1 to 5 carbon atoms can be prepared following the information given in U.S.A. patent specifications Nos. 2,775,583 and 2,740,779, a summary of which is given below

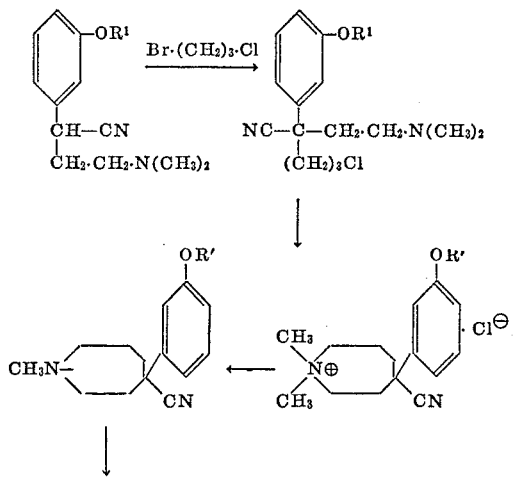

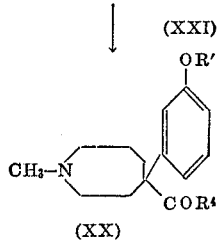

(XX)

The starting materials of general Formula XX in which $R^4$ is a hydrogen atom, can be prepared by reducing the corresponding compounds of Formula XX in which the radical $COR^4$ is replaced by CN (which may be prepared following the information given in the above-mentioned U.S.A. patent specifications), for example by partial reduction with lithium aluminium hydride, di-isobutyl aluminium hydride or a lithium trialkoxyaluminium hydride [see for example Quarterly Reviews 20, 177 (1966)].

The invention provides a general process for the preparation of the compounds of Formula I in which a precursor of the heterocyclic ring system is cyclised. Numerous examples of suitable precursors are described above. It may be necessary to carry out a further step such as reduction, N-alkylation or acylation in order to obtain the desired compound. Such further steps are described above.

The invention also provides a process for the preparation of a hexahydro-1H-azepine derivative of the general Formula I as defined above or an acid addition or quaternary ammonium salt thereof, in which a compound of formula

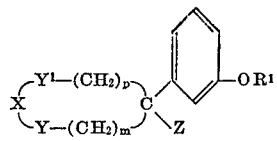

wherein X—Y is —N=CHR—,

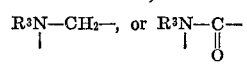

R and $R^3$ being as defined above and $Y^1$ is —$CH_2$—, or X—Y is $R^3N$—$CH_2$— and $Y^1$ is C=O, Z is $R^2$ or $COR^4$, $R^2$ being as defined above and $R^4$ being hydrogen or lower alkyl, p is 2 or 3 and m is 0 or 1 and m+p is 3; is reduced.

This reduction process is described above and in the examples below.

The compounds of the invention produced by the foregoing reactions are, in general racemic mixtures. If the pure optically active isomers are required these can be obtained by employing an optically active precursor in the appropriate process described above, e.g. by resolution of a racemic precursor, or by resolving an end product such as a racemic mixture of Formula I. Such resolutions can be carried out using standard methods known in the art. If necessary an obtained optically active isomer of Formula I may be converted to further compounds of Formula I.

A particularly useful method for preparing the optical isomers of compounds of Formula III is to resolve a racemate of Formula III and then subject one or both of the optical isomers to an after process (such as alkylation, acylation, hydrolysis, hydrogenolysis, formylation or reduction) to give the desired product of Formula III.

Preferably, a compound wherein $R^1$ and $R^3$ are both hydrogen is resolved and a separated optically active isomer is subjected to an after process to obtain the desired optically active isomer of Formula III.

The isomers of the invention in which $R^1$ is a lower alkanoyl radical are conveniently obtained by acylation, e.g. acetylation, of the corresponding isomers where $R^1$ is hydrogen.

As mentioned above, a resolution is preferably carried out on a racemic mixture of a basic compound of general Formula III, by methods described in the literature, such as by use of an optically active acid. For instance, a solution of the racemate in a suitable solvent such as an alcohol is treated with a solution of an optically active acid to cause crystallisation of the salt of one particular enantiomorph. If required the other enantiomorph can often be obtained from the mother liquors, or if necessary by treatment with a base and then with the other optical isomer of the optically active acid, or alternatively a fresh solution of the racemate can be treated with a solution of the other enantiomorph of the optically active acid. The actual solvent and optically active acid to be used in any one instance cannot be predicted, and the choice is determined experimentally. The best combination is that which allows the salt to be most easily isolated in a high state of purity (i.e. freedom from the other enantiomer) and in a crystalline form.

We have found that $D(+)$ and $L(-)$-tartaric acid are particularly suitable for the resolution of some compounds of Formula III, especially the compound in which $R^3$ is hydrogen, $R^2$ is ethyl, $R^1$ is hydrogen and R is hydrogen.

Once a pure salt of one isomer has been isolated, this is then treated with a strong base such as ammonium hydroxide, sodium hydroxide solution or sodium carbonate solution, to liberate the free base of the optically active hexahydro-1H-azepine.

If it is desired to prepare an acid addition salt, a compound general Formula I can be treated with a pharmaceutically acceptable acid, e.g. hydrochloric, sulphuric or maleic acid. Similarly, the free base can be prepared by neutralising an acid addition salt, for example, with an alkali metal carbonate, A quaternary ammonium salt can be prepared by reacting the free base with an alkyl halide.

The reactants employed in the foregoing reactions either are known compounds, which are commercially available or can be prepared by methods known in the art, or are derivatives thereof which can be prepared by well-known chemical procedures from appropriate starting materials following the methods described in the art for the known compounds.

The invention also provides a pharmaceutical composition which comprises a compound of general Formula I, or an acid addition or quaternary ammonium salt thereof, and a pharmaceutically acceptable carrier. The carrier can be solid, liquid or cream-like and any suitable carrier known in the art can be used. The composition may be in the form of a tablet, capsule or solution.

The new and novel compounds of the present invention possess valuable pharmacological activity, in particular, they demonstrate an ability to reduce pain and so may be useful as analgesics. In addition some of the compounds demonstrate the ability to antagonise narcotic analgesics. The compounds of the invention can also be used as intermediates for the preparation of similar compounds.

In the pharmacological evaluation of the properties of the compounds of this invention the effects in vivo of the compounds were tested on mice by the Haffner tail clip method (see F. Haffner, Deutsch. Med. Wschr. 55, 731 (1929)) or by the radiant heat on tail method of D'Amour-Smith (J. Pharmacol, 72, 74 (1941). The analgesic antagonism may be tested for by the method of Casy et al. disclosed in J. Pharm. Pharmacol, 20, 768 (1968).

We have also found that the optical isomers of some hexahydro-1H-azepines falling within general Formula I and which have the Formula III (R=H) shown above, surprisingly show an unusual separation of biological activities. For instance, in general the analgesic activity appears to reside predominantly in one optical isomer, while both generally possess morphine antagonistic activity though one isomer often to a lesser degree than its enantiomer. The isomer may also be used as intermediates in the preparation of similar compounds.

It has been found with these compounds that the dextro-enantiomer have predominantly morphine antagonist activity while generally still possessing analgesic action while the laevo-enantiomers have high analgesic activity.

Especially preferred compounds are $(-)$-1-methyl-3-ethyl-3-(m-hydroxyphenyl)hexahydro - 1H - azepine and $(-)$ - 1 - cyclopropylmethyl - 3 - ethyl - 3 - (m-hydroxyphenyl)hexahydro-1H-azepine, which possess high analgesic activity, sufficient morphine antagonism activity to render them substantially non-addicting and also antiwrithing potency greater than pentazocine. Another especially valuable compound on account of its very high analgesic activity, coupled with morphine antagonism is $(-)$ - 1 - cyclopropylmethyl - 3 - ethyl - 3 - (m-acetoxyphenyl)hexahydro-1H-azepine.

The compounds of this invention in the above test procedures when administered orally and/or i.p. at a dosage of about 10 to about 200 mg./kg. generally demonstrated analgesic activity.

When the compounds of this invention are employed as analgesic agents they may be administered to warm-blooded animals, e.g. mice, rats, rabbits, dogs, cats or monkeys alone or in combination with pharmacologically acceptable carriers, the proportion of which is determined by the solubility and chemical nature of the compounds, chosen route of administration and standard biological practice. For example, they may be administered orally in the form containing such excipients as for example starch, milk or sugar. They may also be administered orally in the form of solutions or they may be injected parenterally. For parenteral administration they may be used in the form of a sterile solution or suspension containing other solutes, for example enough saline or glucose to make the solution isotonic.

The dosage of the present agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following non-limiting examples illustrate the invention:

EXAMPLE 1

3-(m-methoxyphenyl)-1-methyl-3-propylhexahydro-1H-azepine (a) 2-(m-methoxyphenyl)pentanenitrile (18.9 g.) in dry ether (20 ml.) was added to a stirred suspension of sodium amide (from 2.35 g. sodium) in liquid ammonia (250 ml.). The resulting solution was stirred for 30 minutes and 4-iodobutyronitrile (20.5 g.) in ether (40 ml.) added dropwise. On completion of the addition the reaction mixture was stirred for 4 hours. Ether (100 ml.) was added and the ammonia allowed allowed to evaporate off overnight. Water (100 ml.) was added, the organic layer separated, dried over magnesium sulphate and the ether removed by distillation. The viscous oily residue was distilled at 158–164° C./0.3 mm. to yield 5 - cyano - 5 - (m-methoxyphenyl)octanenitrile as a viscous colourless liquid.

(b) The above dinitrile (7.9 g.) was heated under reflux with a mixture of ethylene glycol (30 ml.), water (2.3 ml.) and potassium hydroxide (17 g.) for 3.5 hours. The reaction mixture was poured into water (100 ml.) and extracted with ether. After acidifying, the aqueous layer was extracted with ether, dried over magnesium sulphate and the ether was evaporated to small bulk when 5-carbamoyl-5-(m-methoxyphenyl)octanoic acid crystallised yielding colourless needles 5.9 g., m.p. 172–4° C.

(c) This acid (6.2 g.) in dry tetrahydrofuran was added dropwise with stirring, to a solution of lithium aluminium hydride (7.0 g.) in dry tetrahydrofuran (100 ml.). The mixture was heated under reflux for 7 hours, cooled and 5 N sodium hydroxide (16 ml.) cautiously added. The inorganic material was filtered off and the tetrahydrofuran removed to leave 5-aminomethyl-5-(m-methoxyphenyl)-octan-1-ol as a viscous oil which was distilled at 132–138° C./0.005 mm. to give 3.2 g. of a colourless glass.

This compound could also be prepared by similar reduction of ethyl 5-cyano-5-m-methodxyphenyloctanoate.

(d) The 5 - aminomethyl - 5 - (m - methoxyphenyl) octan-1-ol (4.14 g.) was dissolved in dry chloroform (20 ml.) cooled to 0° C. and saturated with gaseous hydrogen chloride. Thionyl chloride (3.8 g.) was added dropwise keeping the temperature at 0–5° C. The reaction mixture was allowed to warm to room temperature then heated under reflux for 2 hours. The chloroform was removed under reduced pressure, leaving an oil which was added to water (50 ml.) and the material insoluble in water extracted with ether and discarded. The aqueous layer was basified with sodium bicarbonate solution and extracted with ether. After drying over magnesium sulphate, the ether was removed to leave 3.85 g. of a dark oil which was dissolved in propan-2-ol (100 ml.), anhydrous potassium carbonate (4.0 g.) added and the mixture heated under reflux for 6 hours. Removal of the potassium carbonate and evaporation of the propan-2-ol gave an oil which was distilled affording 1.8 g. of 3-(m-methoxyphenyl)-3-propylhexahydro-1H-azepine as a colourless mobile oil B.P. 118–120° C./0.001 mm.

(e) The above hexahydro-1H-azepine (2.77 g.) was hydrogenated at 45 p.s.i. in the presence of formaldehyde (40% aqueous, 2 ml.), 10% palladium on charcoal (2.0 g.) and absolute ethanol (100 ml.). The theoretical quantity of hydrogen was absorbed in 20 min. Filtration of the catalyst and evaporation of the solvent left a colourless mobile oil which was treated with oxalic acid (1.3 g.) in acetone. Colourless needles of 3-(m-methoxyphenyl) - 1-methyl-3-propylhexahydro-1H-azepin oxalate, 2.32 g., M.P. 124–126° C., were obtained. (Found: C, 64.8; H, 8.3; N, 4.0, $C_{19}H_{29}NO_5$ requires C, 64.9; H, 8.3; N, 4.0%.)

EXAMPLE 2

3-(m-hydroxyphenyl)-1-methyl-3-propylhexahydro-1H-azepine

The oxalate of Example 1 (3.28 g.) was heated under reflux with 48 to 50% hydrobromic acid (30 ml.) for 3 hours. The hydrogen bromide was removed under reduced pressure and the residual oil dried by repeatedly re-evaporating with propan-2-ol (100 ml.). The oil was crystallized from acetone ether to yield 2.28 g. of fine white needles. Recrystallisation from propan-2-ol/ether gave the hydrobromide of the title compound as colourless, hygroscopic needles M.P. 118–126° C. (Found: C, 58.35; H, 8.15; N, 4.35. $C_{16}H_{26}BrNO$ requires C, 58.6; H, 8.0; N, 4.3%.)

The hydrobromide could be converted to the free base by treatment with aqueous sodium carbonate solution and recrystallising from light petroleum (B.P. 100–120° C.), M.P. 119–121° C. (Found: C, 77.8; H, 10.1; N, 5.3. $C_{16}H_{25}NO$ requires C, 77.9; H, 10.2; N, 5.7%.)

EXAMPLE 3

3-(m-methoxyphenyl)-3-propylhexahydro-1H-azepine (a) 2-(m-methoxyphenyl)pentanenitrile (75.6 g., 0.4 mole) in dry ether (200 ml.) was added to a stirred suspension of sodium amide (from 9.4 g. sodium) in liquid ammonia (400 ml.). The mixture was stirred for 30 mins. then ethyl 4-iodobutyrate (99.25 g., 0.4 mole) in dry ether (200 ml.) was added dropwise. The mixture was stirred at the temperature of refluxing liquid ammonia for 5 hours. Ammonium chloride (10 g.) was added and the mixture allowed to warm to room temperature. Water (300 ml.) was added, the organic layer separated, washed with water, 2 N sulphuric acid and water. After drying over magnesium sulphate and removing the ether, the product was distilled yielding 77.6 g. of ethyl 5-cyano-5-(m-methoxyphenyl)octanoate, B.P. 156–175° C. at 0.02 mm., $n_D^{23}$ 1.5020.

Ethyl 5-cyano-5-(m-methoxyphenyl)octanoate may also be prepared by hydrolysis of 5 - cyano - 5 - (m-methoxyphenyl)octanenitrile with sulphuric acid: ethyl alcohol mixture (1:10, v./v.) for 30 hours.

(b) Ethyl 5 - cyano - 5 - (m-methoxyphenyl)octanoate (32.0 g.) was hydrogenated at an initial pressure of 1200 p.s.i. and final temperature of 140° C. in cyclohexane (400 ml.) with nickel catalyst (ca. 8 g.) for 18 hours. Removal of the catalyst and evaporation of the cyclohexane left a colourless viscous oil which was crystallised from ethyl acetate affording 18.3 g. of colourless needles of 6-(m-methoxyphenyl) - 6 - propylhexahydro - 2H - azepin-2-one M.P. 109–110° C.

When reduction was carried out at a lower temperature the product consisted mainly of ethyl 5-aminomethyl-5-(m-methoxyphenyl)octanoate. Cyclisation of this compound could be achieved by heating under reflux for 18 hours in dekalin or by heating under reflux with a solution of sodium ethoxide in absolute ethanol.

(c) 3 - (m - methoxyphenyl) - 3-propylhexahydro-2H-azepin-2-one (12 g.) in dry tetrahydrofuran (200 ml.) was added dropwise to a stirred suspension of lithium aluminium hydride (12 g.) in ether (200 ml.) and the mixture was then stirred and heated under reflux for 7 hours. The reaction mixture was decomposed by the addition of water (12 ml.), 2 N sodium hydroxide (24 ml.) followed by water (12 ml.). The organic material which precipitated was filtered, the solvents were removed and the colourless oil remaining was distilled furnishing 9.8 g. of 3 - (m-methoxyphenyl)-3-propylhexahydro-1H-azepine B.P. 123–4° C./0.15 mm.

(d) This compound could be methylated as in Example 1(e) to give the same product as in that example, or could be reacted with allyl bromide to give 1-allyl-3-(m-methoxyphenyl)-3-propylhexahydro-1H-azepine.

EXAMPLE 4

3-(m-methoxyphenyl)-1,3-dimethylhexahydro-1H-azepine (a) 2-(m-methoxyphenyl)propionitrile (25.2 g.) was reacted with sodium amide (from 3.6 g. of sodium) in liquid ammonia (300 ml.) and ethyl 4-iodobutyrate (38.5 g.) following the method of Example 3(a). After similar working up, the product was distilled affording 22.5 g. of ethyl 5-cyano-5-(m-methoxyphenyl)hexanoate, B.P. 132–142° C./0.003 mm.

(b) This compound (15.2 g.) was hydrogenated at an initial pressure of 1000 p.s.i. and final temperature of 140° in the presence of nickel catalyst (ca. 6 g.) in cyclohexane (250 ml.) for 20 hours. The catalyst was removed by filtration, the cyclohexane removed to afford 14.1 g. of a viscous oil which was heated under reflux in dekalin in a nitrogen atmosphere for 20 hours. The dekalin was removed under reduced pressure and the residue crystallised from ethyl acetate to give colourless needles of 6-(m-methoxyphenyl) - 6 - methyl-hexahydro-2H-azepin-2-one, 5.3 g., M.P. 114–115° C.

A further 2.7 g. of crystalline material could be obtained by distillation of the mother liquors, followed by recrystallisation from ethyl acetate.

(c) The hexahydro-2H-azepin-2-one (11.7 g.) in dry tetrahydrofuran was added to a suspension of lithium aluminium hydride (12 g.) in ether (200 ml.). The procedure described in Example 3(c) was followed and the product obtained was distilled yielding 8.9 g. of 3-(m-methoxyphenyl) - 3 - methylhexahydroazepine, B.P. 118–125° C./0.5 mm.

(d) 3-(m - methoxyphenyl) - 3 - methylhexahydro-1H-azepin (8.75 g.) was reacted with formaldehyde (40% aq., 4 ml.) in the presence of 10% palladium on charcoal (1.5 g.) in ethanol (100 ml.) in the presence of hydrogen at 40 atm. pressure following the procedure described in Example 1(e) to give 3-(m-methoxyphenyl)-1,3-dimethyl-hexahydro-1H-azepin, as a colourless oil, 7.7 g., B.P. 106–7° C./0.4 mm., $n_D^{23}$ 1.5339. (Found: C, 76.8; H. 9.8; N, 5.9. $C_{15}H_{23}NO$ requires C, 77.2; H, 9.9; N, 6.0%.)

The hydrochloride of M.P. 154–5° C. could be prepared by treatment with propan-2-ol and a solution of hydrogen chloride in ether. (Found: C, 66.7; H. 8.9; N, 5.0. $C_{15}H_{23}NO.HCl$ requires C, 66.7; H, 8.9; N, 5.2%.)

EXAMPLE 5

3-(m-hydroxyphenyl)-1,3-dimethyl-hexahydro-1H-azepine

The product of Example 4 (5.1 g.) was heated under reflux with 48–50% hydrobromic acid (50 ml.) for 3 hours. The hydrogen bromide was removed under reduced pressure and the residual oil dried by repeatedly evaporating from propan-2-ol. The title compound crystallised as the hydrobromide in colourless needles from propan-2-ol/ether, 6.0 g., M.P. 174–5° C. (Found: C, 55.8; H, 7.2; N, 4.4. $C_{14}H_{21}NO.HBr$ requires C, 56.0; H, 7.4; N, 4.6%)

EXAMPLE 6

3-(m-acetoxyphenyl)-1,3-dimethylhexahydro-1H-azepine

The product of Example 5 (2.0 g.) was heated under reflux with acetic anhydride (6 ml.) and pyridine (3 ml.) for 3 hours. The reaction mixture was evaporated to a brown oil which was dissolved in water and basified with sodium bicarbonate solution. The basic material was extracted with ether, dried over magnesium sulphate and evaporated to a colourless oil. The oil was dissolved in propan-2-ol and treated with a solution of hydrogen chloride in dry ether to give the hydrochloride of the title compound. Yield 1.7 g., M.P. 164–5° C. (Found: C, 64.3; H, 8.2; N, 4.6. $C_{16}H_{24}NO_2Cl$ requires C, 64.55; H, 8.1; N, 4.7%.)

EXAMPLE 7

By replacing the allyl bromide used in Example 3(d) with the reactants listed below, the following compounds can be prepared.

| Reactant | Product |
| --- | --- |
| Propyl chloride | 3-(m-methoxyphenyl)-1,3-dipropyl-hexahydro-1H-azepine. |
| Prop-2-ynyl bromide | 3-(m-methoxyphenyl)-3-propyl-1-(prop-2-ynyl)-hexahydro-1H-azepine. |
| Cyclopropylmethylchloride | 1-cyclopropylmethyl-3-(m-methoxyphenyl)-3-propylhexahydro-1H-azepine. |
| Phenacyl bromide | 3-(m-methoxyphenyl)-1-phenacyl-3-propylhexahydro-1H-azepine. |
| Phenethyl chloride | 3-(m-methoxyphenyl)-1-phenethyl-3-propylhexahydro-1H-azepine. |
| p-Nitrophenethyl chloride | 1-(p-nitrophenethyl-3-(m-methoxyphenyl)-3-propyl-hexahydro-1H-azepine which can be reduced to the corresponding p-amino compound. |
| β-Benzoylethyl chloride | 1-(β-benzoylethyl)-3-(m-methoxyphenyl)-3-propylhexahydro-1H-azepine. |
| 3-methylbut-2-enyl chloride | 3-(m-methoxyphenyl)-1-(3-methylbut-2-enyl)-3-propylhexahydro-1H-azepine. |

EXAMPLE 8

3-(m-acetoxyphenyl)-1-methyl-3-propylhexahydro-1H-azepine

The procedure of Example 6 was followed, but using 3-(m-hydroxyphenyl) - 1 - methyl-3-propylhexahydro-1H-azepine (1.5 g.) as starting material to give the title compound (1.36 g.) after basification with sodium carbonate, B.P. (0.01 mm.) 176–8° C. (Found: C, 74.8; H, 9.5; N, 4.8. $C_{18}H_{27}NO_2$ requires C, 74.7; H, 9.4; N, 4.8%.)

EXAMPLE 9

4-(m-methoxyphenyl)-1-methyl-4-propylhexahydro-1H-azepine

4 - ethylcarbonyl - 4 - (m-methoxyphenyl)-1-methyl-hexahydro-1H-azepine hydrochloride (17.1 g.) was added to a stirred solution of hydrazine hydrate (184 ml. of 99% solution) and hydrazine hydrochloride (46.2 g.) in diethylene glycol (750 ml.). The reaction mixture was maintained at 120–130° C. for 3 hours then potassium hydroxide pellets (85%, 80 g.) were added portionwise. When the addition was completed, water and hydrazine were slowly distilled from the reaction mixture until the internal temperature had reached 220° C. This temperature was maintained for 3 hours. The reaction mixture was cooled, poured into water (1 litre) and extracted with ether. After drying over magnesium sulphate and removing the solvent, 6.8 g. of basic oil were obtained. When treated with 1 mole of fumaric acid in acetone/ether a total of 5 g. of 4-(m-methoxyphenyl)-1-methyl-4-propyl-hexahydro-1H-azepine fumarate were obtained, M.P. 153–5° C. (Found: C, 66.9; H, 8.1; N, 3.9. $C_{21}H_{23}NO_5$ requires C, 66.8; H, 8.3; N, 3.7%.)

EXAMPLE 10

4-(m-hydroxyphenyl)-1-methyl-4-propylhexahydro-1H-azepine

The fumarate of Example 9 (5.5 g.) was heated under reflux with 48–50% hydrobromic acid for 3 hours. The excess acid was removed by evaporation under reduced pressure and dried by re-evaporation with several portions of butan-2-one. On redissolving the residual oil in butan-2-one, 4.5 g. of crystals of the hydrobromide of the title compound were obtained, M.P. 157–9° C. Recrystallisation from acetone/propan-2-ol raised the M.P. to 159–161° C. (Found: C, 58.3; H, 8.4; N, 4.2; Br. 24.2. $C_{16}H_{26}BrNO$ requires C, 58.6; H, 8.0; N, 4.3; Br, 24.4%.)

EXAMPLE 11

4-(m-acetoxyphenyl)-1-methyl-4-propylhexahydro-1H-azepine

The product of Example 10 (984 mg.) was heated at 110° C. with pyridine (2 ml.) and acetic anhydride (4 ml.) for 3 hours. The reaction mixture was concentrated at reduced pressure, poured into water, basified with sodium carbonate and extracted into ether. The product was distilled to yield the title compound of B.P. 140–150° C. at $10^{-4}$ mm. (Found: C, 74.8; H, 9.4; N, 4.8. $C_{18}H_{27}NO_2$ requires C, 74.7; H, 9.4; N, 4.8%.)

EXAMPLE 12

The procedure of Example 9 can be followed, but replacing the starting material by one of the compounds specified below (which were prepared as described herein) to give the following products.

| Starting material | Product |
| --- | --- |
| 4-(m-methoxyphenyl)-1-methyl-4-propylcarbonylhexahydro-1H-azepine. | 4-n-butyl-4-(m-methoxyphenyl)-1-methylhexahydro-1H-azepine. |
| 4-(m-methoxyphenyl)-1-methyl-4-n-pentylcarbonylhexahydro-1H-azepine. | 4-hexyl-4-(m-methoxyphenyl)-1-methylhexahydro-1H-azepine. |
| 4-formyl-4-(m-methoxyphenyl)-1-methylhexahydro-1H-azepine. | 4-(m-methoxyphenyl)-1,4-dimethylhexahydro-1H-azepine. |
| 4-ethylcarbonyl-4-(m-isopropoxyphenyl)-1-methylhexahydro-1H-azepine. | 4-(m-isopropoxyphenyl)-1-methyl-4-propylhexahydro-1H-azepine. |
| 4-ethylcarbonyl-4-(m-n-butoxyphenyl)-1-methylhexahydro-1H-azepine. | 4-(m-n-butoxyphenyl)-1-methyl-4-propylhexahydro-1H-azepine. |

EXAMPLE 13

The product of Example 9 can be demethylated by reaction with cyanogen bromide and the 4-(m-methoxyphenyl)-4-propylhexahydro-1H-azepine formed can be reacted with one of the halides listed below to give the products indicated.

| Reactant | Product |
| --- | --- |
| Propyl chloride | 4-(m-methoxyphenyl)-1,4-dipropyl hexahydro-1H-azepine. |
| Prop-2-ynyl bromide | 4-(m-methoxyphenyl-4-propyl-1-(prop-2-ynyl)hexahydro-1H-azepine. |
| Cyclopropylmethyl chloride | 1-cyclopropylmethyl-4-(m-methoxyphenyl)-4-propylhexahydro-1H-azepine. |
| Phenacyl bromide | 4-(m-methoxyphenyl)-1-phenacyl-4-propylhexahydro-1H-azepine. |
| Phenethyl chloride | 4-(m-methoxyphenyl)-1-phenethyl-4-propylhexahydro-1H-azepine. |
| p-Nitrophenethyl chloride | 4-(m-methoxyphenyl)-1-(p-nitrophenethyl)-4-propylhexahydro-1H-azepine, which can be reduced to the corresponding p-amino compound. |
| β-Benzoylethyl chloride | 1-(β-benzoylethyl)-4-(m-methoxyphenyl)-4-propylhexahydro-1H-azepine. |
| 3-methylbut-2-enyl chloride | 4-(m-methoxyphenyl)-1-(3-methylbut-2-enyl)-4-propylhexahydro-1H-azepine. |
| Allyl bromide | 1-allyl-4-(m-methoxyphenyl)-4-propyl-hexahydro-1H-azepine. |
| n-Hexyl chloride | 1-(n-hexyl)-4-(m-methoxyphenyl)-4-propylhexahydro-1H-azepine. |

EXAMPLE 14

3-(m-methoxyphenyl)-2,3-dimethylhexahydro-1H-azepine (a) 2 - (m - methoxyphenyl)propionitrile (64 g.) was added to a stirred suspension of sodium amide (18 g.) in dry toluene (160 ml.) at 60° C. On completion of the addition, dry tetrahydrofuran (20 ml.) was added and the mixture stirred at 80° C. for 1 hour. This mixture was then added dropwise to a solution of 1-bromo-4-chlorobutane (72 g.) in dry toluene (200 ml.) at 5–10° C. under nitrogen over a period of 2 hours, the mixture was allowed to warm up to room temperature and stirred overnight. The reaction mixture was poured into water and the toluene layer separated. The organic layer was washed successively with 2 N hydrochloric acid and water. After drying over magnesium sulphate, and evaporating the solvent, 6-chloro - 2 - (m-methoxyphenyl)-2-methyl-hexanenitrile was obtained on careful distillation as a colourless oil (43.4 g.), B.P. 152–154° at 0.8 mm. (Found: C, 67.0; H, 7.3; N, 5.7. $C_{14}H_{18}ClNO$ requires C, 66.8; H, 7.2; N, 6.0%.)

(b) The chloronitrile of part (a) (3.13 g.) in dry toluene (100 ml.) was added to methylmagnesium iodide (0.0285 mole) in ether (20 ml.) under a stream of nitrogen. On completion of the addition the ether was distilled from the reaction mixture until the internal temperature was 90° C. and then heated at this temperature for 24 hours. After cooling, the reaction mixture was poured onto a mixture of ice and ammonium chloride, the aqueous layer was separated and extracted with benzene. The combined organic layers were dried over magnesium sulphate and evaporated under reduced pressure at 40° C. leaving a viscous oil. The oil was repeatedly extracted with boiling ether leaving a yellow gum which deposited pale yellow rhombs from propan-2-ol of 3-(m-methoxyphenyl) - 2,3-dimethyl-4,5,6,7,-tetrahydro-3H-azepine hydroiodide (1.0 g.), M.P. 164–168° C. The compound could be recrystallised for analysis from propan-2-oil. (Found, C, 50.35; H, 6.2; N, 3.8. $C_{15}H_{21}NO.HI$ requires C, 50.2; H, 6.0; N, 3.8%.)

(c) The tetrahydroazepine hydriodide (6.1 g.) was added portionwise to a refluxing solution of aluminium lithium hydride (1.5 g.) in ether (200 ml.). On completion of the addition, dry tetrahydrofuran (100 ml.) was added and the mixture heated under reflux for 4 hours. After cooling to room temperature the reaction mixture was decomposed by the addition of water (1.5 ml.), and 2 N sodium hydroxide (3 ml.). Filtration and evaporation afforded an oil which was distilled yielding 3.1 g. of the title compound as a colourless oil, B.P. 128–130° C. at 0.5 mm. (Found: C, 77.15; H, 9.9; N, 5.8. $C_{15}H_{23}NO$ requires C. 77.2; H, 9.9; N, 6.0%).

The above oil was dissolved in propan-2-oil and treated with a solution of hydrogen chloride in dry ether to give colourless needles of the hydrochloride, M.P. 166–167° C. (Found: C, 66.8; H, 8.8; N, 5.0. $C_{15}H_{23}NO.HCl$ requires C, 66.7; H, 9.0; N, 5.2%.)

EXAMPLE 15

1,2,3-trimethyl-3-(m-methoxyphenyl)hexahydro-1H-azepine

The azepine of Example 14(c) (3.0 g.) in absolute ethanol (100 ml.) containing 40% aq. formaldehyde (2 ml.) was hydrogenated at an initial pressure of 48 p.s.i. After the theoretical quantity of hydrogen had been absorbed the catalyst was filtered off leaving the product as an oil (2.21 g.), B.P. 104–110° C. at 0.01 mm. (Found: C, 78.0; H, 10.2; N, 5.4. $C_{16}H_{25}NO$ requires C, 77.9; H, 10.2; N, 5.7%.)

The above oil was converted to the hydrobromide in propan-2-oil with 50% aqueous hydrogen bromide. The product was recrystallised from propan-2-oil and M.P. 232–235° C. (Found: C, 58.5; H, 8.0; N, 4.2. $C_{16}H_{25}NO.HBr$ requires C, 58.4; H, 8.0; N, 4.3%.)

EXAMPLE 16

3-(m-hydroxyphenyl)-1,2,3-trimethylhexahydro-1H-azepine

The azepine of Example 15 (2.1 g.) was heated under reflux with 50% hydrobromic acid for 2 hours. On cooling, colourless chunky rhombs of the hydrobromide (2.06 g.) were obtained, M.P. 234–6° C. The product could be obtained as either needles M.P. 230–231° C., or rhombs M.P. 234–40° C., clear 250° C., on recrystallisation from methanol. These two crystal forms were shown to be identical by interconversion, I.R. spectrum and analysis. (Found: C, 57.3; H, 7.8; N, 4.2. $C_{15}H_{23}NO$. HBr requires C, 57.3; H, 8.0; N, 4.6%.)

EXAMPLE 17

3-butyl-3-(m-methoxyphenyl)-1-methylhexahydro-1H-azepine (a) Ethyl 5-cyano - 5 - (m-methoxyphenyl)nonanoate was prepared following the method of Example 3(a), using sodium amide (from sodium 5.36 g.) in liquid ammonia (400 ml.), 2-(m-methoxyphenyl)-hexanitrile (45 g.) and ethyl 4-iodobutyrate (53.4 g.). The product was obtained as a colourless oil (48.7 g.), B.P. 150–166° C. at 0.01 mm.

(b) The product of Example 17(a) (30.0 g.) was hydrogenated in the presence of Raney nickel (ca. 6 g.) and cyclohexane (400 ml.) following the procedure of Example 3(b). The product was recrystallised from ethyl acetate affording 15.12 g. of 6-butyl-6-(m-methoxyphenyl)hexahydro-2H-azepine-2-one, M.P. 108–9° C.

(c) The product of Example 17(b) (12.2 g.) in dry tetrahydrofuran (200 ml.) was reduced with aluminium lithium hydride (12 g.) in dry ether (200 ml.) by the method of Example 3(c). The product was distilled, B.P. 130–140° C. at 0.25 mm., affording 7.14 g. of 3-butyl-3-(m-methoxyphenyl) hexahydro-1H-azepine as a colourless mobile oil.

(d) The secondary base obtained in Example 17(c) (7.14 g.) was reductively methylated as described in Example 1(e). The title compound, obtained as a crude oil from the reaction mixture, was converted to its oxalate (5.01 g.), M.P. 147–50° C. (Found: C, 65.5; H, 8.6; N, 3.75. $C_{18}H_{29}NO.C_2H_2O_4$ requires C, 65.6; H, 8.6; N, 3.8%.)

EXAMPLE 18

3-butyl-3-(m-hydroxyphenyl)-1-methylhexahydro-1H-azepine

The oxalate of Example 17(d) (4.1 g.) was heated under reflux with 50% hydrobromic acid (40 ml.) for 2 hours. The product was isolated following the procedure described in Example 2 and converted to the free base. Recrystallisation from light petroleum (B.P. 80–100° C.) afforded the title compound (1.7 g.), M.P. 116–118° C. (Found: C, 78.0; H, 10.5; N, 5.25. $C_{17}H_{27}NO$ requires C, 78.1; H, 10.4; N, 5.4%.)

EXAMPLE 19

3-ethyl-3-(m-methoxyphenyl)hexahydro-1H-azepine (a) Ethyl 5-cyano-5-(m-methoxyphenyl)heptanoate was prepared following the method of Example 3(a), using sodium amide (from sodium 3.74 g.) in liquid ammonia (150 ml.), and 2-(m-methoxyphenyl)buytronitrile (26.3 g.). The product was distilled B.P. 148–155° C./0.01 mm. yielding 27.1 g. of a colourless liquid.

(b) The product of Example 19(a) (20.5 g.) in cyclohexane (200 ml.) was hydrogenated in the presence of Raney nickel (ca. 6 g.) following the procedure described in Example 3(b). The product after distillation was recrystallised from ethyl acetate affording 10.0 g. of 6-ethyl-6-(m-methoxyphenyl)-hexahydro-2H-azepin-2-one, M.P. 87–88° C.

(c) The azepinone of Example 19(b) (9.1 g.) in dry tetrahydrofuran (50 ml.) and ether (50 ml.) was added dropwise to a stirred suspension of aluminium lithium hydride (7.5 g.) in dry ether (50 ml.). After heating under reflux for 3 hours the reaction mixture was worked up following the procedure described in Example 3(c) and distilled yielding 7.66 g. of the title compound as a colourless oil, B.P. 108–110° C./0.01 mm.

EXAMPLE 20

3-ethyl-3-(m-hydroxyphenyl)hexahydro-1H-azepine

The product of Example 19(c) (2.2 g.) was heated under reflux for 50% hydrobromic acid for 1.5 hours. The reaction mixture was evaporated to dryness and re-evaporated with three portions of propan-2-ol. The oil obtained was dissolved in propan-2-ol and diluted with ether. The title compound (2.5 g.) was obtained as its hydrobromide, M.P. 183–5° C. (Found: C, 55.9; H, 7.43; N, 4.35. $C_{14}H_{21}NO.HBr$ requires C, 56.0; H, 7.4; N, 4.7%.)

EXAMPLE 21

3-ethyl-3-(m-hydroxyphenyl)-1-methylhexahydro-1H-azepine (a) The azepine of Example 19(c) (5.13 g.) was reductively methylated by the method of Example 1(e). The crude oil obtained was converted to the hydrobromide (4.9 g.), M.P. 142–3° C. Recrystallisation from propan-2-ol raised the M.P. of the 3-ethyl-3-(m-methoxyphenyl)-1-methylhexahydro-1H-azepine hydrobromide obtained to 143–4° C. (Found: C, 58.8; H, 8.2; N, 4.0.

$C_{15}H_{23}NO.HBr$ requires C, 58.6; H, 8.0; N, 4.3%.)

(b) The methoxy compound of Example 21(a) (2.85 g.) was heated under reflux with 80% hydrobromic acid (15 ml.) for 2 hours and worked up following the procedure as described for Example 5. The title compound was obtained at its hydrobromide (2.47 g.), M.P. 221–2° C. (Found: C, 57.4; H, 7.8; N, 4.3. $C_{15}H_{23}NO.HBr$ requires C, 57.4; H, 7.7; N, 4.5%.)

EXAMPLE 22

3-(m-hydroxyphenyl)-3-propylhexahydro-1H-azepine

The product of Example 3(c) (6.1 g.) was heated under reflux with 50% hydrobromic acid (40 ml.) for 2.5 hours. The product was worked up as described in Example 21(b) above to yield the hydrobromide of the title compound (5.88 g.), M.P. 74–8° C. as a hygroscopic solid. (Found: C, 57.4; H, 7.8; N,4.5. $C_{15}H_{23}NO.HBr$ requires C, 57.4; H, 7.7; N, 4.5%.)

EXAMPLE 23

1-carbethoxy-3-(n-hydroxyphenyl)-3-propyl-hexahydro-1H-azepine

Ethyl chloroformate (1 ml.) in chloroform (10 ml.) was added to a cooled solution of the product obtained in Example 22 (3.14 g.) in chloroform (10 ml.) and triethylamine (2.03 g.). On completion of the addition the reaction mixture was stirred at room temperature for 2 hours. Ether was added to precipitate the triethylamine hydrochloride/hydrobromide, and the filtrate washed with water. Evaporation afforded a glass which was distilled, B.P. 210–220° C. (bath temperature) at 0.005 mm. giving 1.54 g. of viscous oil. (Found: C, 70.2; H, 8.9; N, 4.3. $C_{18}H_{27}NO_3$ requires C, 70.8; H, 8.9; N, 4.6%.)

EXAMPLE 24

1-allyl-3-(m-hydroxyphenyl)-3-propylhexahydro-1H-azepine

A mixture of the product of Example 22 (4.3 g.), 3-bromoprop-1-ene (1.655 g.) and potassium carbonate (anhydrous, 8.1 g.) in butan-2-one (100 ml.) was heated under reflux while stirring for 16 hours. The reaction mixture was cooled and the solid material removed by filtration. Removal of the solvent afforded an oil which was dissolved in acid and extracted with ether; these ether extracts were discarded. The acid layer was basified with concentrated ammonia solution and extracted with ether. After drying, the ether was removed to yield a viscous oil which gave a crystalline toluene-p-sulphonate salt (2.5 g.), M.P. 126–7° C. (Found: C, 67.5; H, 8.0; N, 3.0 $C_{18}N_{27}NO.C_7H_8O_3S$ requires C, 67.4; H, 8.0; N, 3.0%.)

EXAMPLE 25

3-(m-hydrophenyl)-3-methylhexahydro-1H-azepine

The product of Example 4(c) (12.64 g.) in 50% aqueous hydrobromic acid (120 ml.) was heated under reflux for 1 hour. The acid was removed by evaporation under reduced pressure and the product dried by azeotroping with propan-2-ol. The product (15.6 g.) crystallized as its hydrobromide, a white solid, from propan-2-ol, M.P. 203–4° C. (Found: C, 54.3; H, 6.8; N, 4.75.

$C_{13}H_{19}NO.HBr$ requires C, 54.55; H, 7.0; N, 4.5%.)

EXAMPLE 26

1-allyl-3-(m-hydroxyphenyl)-3-methyl-hexahydro-1H-azepine

The product of Example 25 (2.86 g.) was heated under reflux, while stirring, with a mixture of potassium carbonate (anhydrous, 2.8 g.), 3-bromoprop-1-ene (1.21 g.) and butan-2-one (100 ml.) for 20 hours. The solid was removed by filtration and the filtrate evaporated to a viscous oil. The oil was dissolved in ether and the basic material isolated in the usual fashion. Distillation afforded a viscous oil (1.62 g.), B.P. (0.001 mm.) 160–165° C. (Found: C, 78.4; H, 9.5; N, 5.65. $C_{16}H_{23}NO$ requires C, 78.3; H, 9.45; N, 5.7%.)

EXAMPLE 27

3-(m-hydroxyphenyl)-1,3-dimethylhexahydro-1H-azepine

The azepine of Example 14(c) (4.6 g.) was heated under reflux with 50% aqueous hydrobromic acid (10 ml.) for 2 hours. The solvent was removed under reduced pressure and the orange oil repeatedly evaporated with propan-2-ol. The product crystallised from propan-2-ol/

EXAMPLE 28

1-allyl-2,3-dimethyl-3-(m-hydroxyphenyl) hexahydro-1H-azepine 2,3-dimethyl - 3 - (m-hydroxyphenyl)hexahydro-1H-azepine hydrobromide (1.5 g.) was heated under reflux with anhydrous potassium carbonate (2.8 g.) and 1-bromo-2-propene (0.61 g.) in propan-2-one (75 ml.) for 16 hours. The reaction mixture was cooled, filtered and evaporated to an oil which was dissolved in propan-2-ol and acidified with 50% aqueous hydrogen bromide. Repeated evaporation with small quantities of propan-2-ol removed the last traces of water and the product was crystallised from propan-2-ol (800 mg.), M.P. 212–214° C. (Found: C, 60.0; H, 7.95; N, 4.0. $C_{17}H_{25}NO.HBr$ requires C, 59.9; H, 7.7; N, 4.1%.)

EXAMPLE 29

3-(m-acetoxyphenyl)-3-ethylhexahydro-1H-azepine

The azepine hydrobromide of Example 20 (1.5 g.) was heated in a sealed tube with a mixture of hydrogen bromide in glacial acetic acid (5 ml.) and acetyl bromide (3 ml.) for 2 hours at 100° C. The tube was cooled and the reaction mixture evaporated to dryness at room temperature and reduced pressure. Propan-2-ol (25 ml.) was added and also evaporated off at room temperature. The residue was recrystallised from propan-2-one/ether affording 1.36 g. of off-white needles, M.P. 120–125° C. The product was recrystallised from propan-2-one/ether to give 725 mg. of the title compound, M.P. 125–30° C. (does not clear). (Found: C, 56.1; H, 7.1; N, 4.0. $C_{16}H_{23}NO_2HBr$ requires C, 56.15; H, 7.1; N, 4.1%.)

EXAMPLE 30

3-(m-acetoxyphenyl)-1-acetyl-3-ethylhexahydro-1H-azepine

The azepine hydrobromide of Example 20 was heated under reflux for 3 hours with acetylbromide (5 ml.) and hydrogen bromide in acetic acid (45%, 10 ml). The acetic acid and acetyl bromide were removed under reduced pressure and the last traces removed by co-distillation with toluene. The residue was distilled affording a pale yellow glass (0.47 g.), B.P. at 0.5 mm. 170–180° C. (Found: C, 71.25; H, 8.4; N, 4.6. $C_{18}H_{25}NO_3$ requires C, 71.25; H, 8.31; N, 4.6%.)

EXAMPLE 31

3-(m-hydroxyphenyl)-3-iso-propylhexahydro-1H-azepine (a) 2 - m-methoxyphenyl-3-methylbutyronitrile (37.8 g.) was added dropwise to a suspension of sodium amide (from sodium 4.6 g.) in liquid ammonia (200 ml.). On completion of the addition, the reaction mixture was stirred at −30° C. for 0.5 hour then ethyl 4-iodobutyrate (50.8 g.) in ether (150 ml.) was added dropwise. The reaction was stirred for 3 hours and left overnight. The reaction mixture was worked up as described in Example 3(a). The product was distilled affording 28.6 g. of ethyl 5 - cyano - 5-m-methoxyphenyl-6-methylheptanoate, B.P. 146–148° C./0.01 mm.

(b) The above ester (24.8) was hydrogenated in cyclohexane (250 ml.) in the presence of nickel catalyst (ca. 6.0 g.) as described in Example 4(b). Removal of the solvent afforded 4.69 g. of white crystals, M.P. 146–148° C. Recrystallisation from ethylacetate afforded colourless needles of 6(m-methoxyphenyl)-6-methylhexahydro-2H-azepin-2-one, M.P. 148–150° C. (Found: C, 73.7; H, 9.0; N, 5.2; $C_{16}H_{23}NO_2$ requires C, 73.35; H, 8.9; N, 5.4%.)

(c) The above azepinone (6.8 g.) in tetrahydrofuran (150 ml.) was reduced with lithium aluminium hydride (5.0 g.) as described in Example 3(c). The product was distilled affording 6.1 g. of colourless oil, B.P. 110–112° C./0.01 mm. The product could be converted to a hydrobromide and recrystallised from propan-2-one/ether, M.P. 170–171° C. (Found: C, 58.65; H, 8.0; N, 4.3.

$C_{16}H_{25}NO \cdot HBr$ requires C, 58.6; H, 8.0; N, 4.3%.)

(d) The azepine of part (c) (2.5 g.) was heated under reflux with 50% aqueous hydrochloric acid (10 ml.) for 1 hour. The solvent was removed under reduced pressure and the last traces of water were removed by azeotroping with propan-2-ol. The title compound as its hydrobromide was obtained as colourless needles, 2.08 g., M.P. 95–98° C. from propan-2-ol/ether. (Found: C. 57.4; H, 8.1; N, 4.0. $C_{15}H_{23}NO \cdot HBr$ requires C, 57.3; H, 7.7; N, 4.5%.)

EXAMPLE 32

3-(m-hydroxyphenyl)-1-methyl-3-iso-propylhexahydro-1H-azepine (a) 3 - (m-methoxyphenyl)-3-iso-propylhexahydro-1H-azepine (3.0 g.) was reacted with 40% aqueous formaldehyde (3 ml.) in the presence of 10% palladium charcoal (2.0 g.) in ethanol (80 ml.) in a Parr hydrogenator as described in Example 1(e). After workup, the product (3.0 g.) was used crude for the next experiment. (b) The product from the above reaction (3.0 g.) was heated under reflux with 50% aqueous hydrogen bromide for 1 hour. The solvent was removed under reduced pressure and the product dissolved in water and converted to the free base. After extraction with benzene, drying, removing the solvent, the title compound was obtained as a fumarate (3.0 g.), M.P. 180–182° C. (Found: C, 66.0; H, 8.3; N, 3.8. $C_{16}H_{25}NO \cdot C_4H_4O_4$ requires C, 66.1; H, 8.0; N, 3.85%.)

EXAMPLE 33

3-butyl-3-(m-hydroxyphenyl)hexahydro-1H-azepine

The azepine of Example 17(c) (1.61 g.) was heated under reflux with 50% aqueous hydrobromic acid (5 ml.) for 1.5 hours. The solvent was evaporated to an oil under reduced pressure and the product dried by repeatedly evaporating with portions of propan-2-ol. The hydrobromide of the title compound was obtained as off-white hygroscopic needles, (1.64 g.), M.P. 88–94° C. (Found: C, 58.35; H, 8.2; N, 4.0. $C_{16}H_{25}NO \cdot HBr$ requires C, 58.7; H, 8.0; N, 4.3%.)

EXAMPLE 34

1-allyl-3-ethyl-3-(m-hydroxyphenyl)hexahydro-1H-azepine

A mixture of 3-ethyl-3-(m-hydroxyphenyl)hexahydro-1H-azepine hydrobromide (3.0 g.) allyl bromide (1.2 g.) and potassium carbonate (3.0 g.) in acetone (40 ml.) was heated under reflux for 16 hours. The excess of acetone was removed under reduced pressure, acetic anhydride (1 ml.) added, warmed for 1 hour at 100° C. and then basified with sodium carbonate solution. The precipitated oil was extracted into ether which in turn was extracted with dilute hydrochloric acid. The acid extract was then basified and again extracted with ether. The organic extract was dried ($MgSO_4$) and evaporated in vacuo to give 2.6 g. of the crude allyl derivative.

The residue was dissolved in the minimum amount of iso-propanol and then 50% hydrobromic acid added until the solution was slightly acid. The precipitated brown oil was crystallised from a mixture of acetone and ether, and then recrystallised from a mixture of ethanol and ether to give 1.55 g. of the title compound as its hydrobromide, M.P. 141–142° C. (Found: C, 60.1; H, 7.7; N, 3.9. $C_{17}H_{25}NO \cdot HBr$ requires C, 6.15; T, 7.7; N, 4.1%.)

EXAMPLE 35

3-ethyl-1-formyl-3-(m-hydroxyphenyl)hexahydro-1H-azepine

A mixture of 3-ethyl-3-(m-hydroxyphenyl)hexahydro-1H-azepine (1.5 g.) and 95% formic acid (10 ml.) was heated at 160° C. for 16 hours. Evaporation of the excess of formic acid in vacuo gave an oily residue which was dissolved in benzene, washed with water, dilute sodium carbonate solution and water, dried (MgSO₄) and evaporated to give 1.2 g. of the crude product. Fractional distillation then gave 0.5 g. of the product, B.P. 240–250° C./0.001 mm. (Found: C, 72.4; H, 8.65; N, 5.6. $C_{15}H_{21}NO_2$ requires C, 72.8; H, 8.5; N, 5.7%.)

EXAMPLE 36

1-carbethoxy-3-ethyl-3-(m-hydroxyphenyl)hexahydro-1H-azepine

To a stirred and ice-cooled solution of 3-ethyl-3-(m-hydroxyphenyl)hexahydro-1H-azepine hydrobromide (4.0 g.) in chloroform (20 ml.) was added a solution of triethylamine (2.66 g.) in chloroform (10 ml.) followed by dropwise addition of a solution of ethyl chloroformate (1.44 g.) in chloroform (10 ml.). The resulting mixture after stirring for 2 hours at ice-temperature was allowed to stand a further 16 hours at room temperature. Ether was added to precipitate the mixture of triethylamine hydrochloride and triethylamine hydrobromide which was then filtered off. The filtrate was washed with water, dried (MgSO₄), evaporated under reduced pressure and the residual red oil fractionally distilled to give 2.1 g. of the title compound, B.P. 172–180° C./0.001 mm. (Found: C, 70.3; H, 8.8; N, 4.9. $C_{17}H_{24}NO_3$ requires C, 70.35; H, 8.3; N, 4.8%.)

EXAMPLE 37

3-ethyl-3-(m-methoxyphenyl)hexahydro-1H-azepine

A solution of 6-ethyl-6-(m-methoxyphenyl)hexahydro-2H-azepin-2-one (12.3 g.) in sodium dried benzene (30 ml.) was added dropwise to a benzene solution (56 ml.) of sodium dihydro-bis(2-methoxyethoxy) aluminate (40.34 g.). The mixture was then heated under reflux for 5 hours and the complex then decomposed by addition of 2 N sodium hydroxide solution. The organic layer was separated and then extracted with dilute hydrochloric acid. The acidic extract was basified by addition of 0.880 ammonia solution and extracted with ether, which after drying (MgSO₄) was evaporated under reduced pressure to give 7.0 g. of the title compound. This compound was also prepared by lithium aluminium hydride reduction of the same 2H-azepin-2-one, details of which are given in Example 19.

EXAMPLE 38

4-(m-hydroxyphenyl)-4-propylhexahydro-1H-azepine (a) 1-methyl-4-(m-methoxyphenyl)-4-propylhexahydro-1H-azepine (2.82 g.) in dry methylene chloride (15 ml.) was treated dropwise at 5° C. with phenylchloroformate (1.63 g.). The reaction mixture was left at room temperature for 4 hours then washed with 2 N sodium hydroxide solution and 2 N sulphuric acid. After drying over magnesium sulphate the solvent was removed leaving 3.8 g. of a colourless oil.

(b) The crude oil obtained above (1.3 g.) was heated under reflux with 50% aqueous hydrogen bromide (10 ml.) for 1.5 hours. The solvent was removed under reduced pressure, the residual oil was dissolved in water, made alkaline and extracted with ether. The product was distilled in a bulb-tube affording 304 mg. of a colourless glass, B.P. 180–200° at 0.003 mm. (Found: C, 76.9; H, 9.8; N, 5.8. $C_{15}H_{23}NO$ requires C, 77.2; H, 9.9; N, 6.0%.)

EXAMPLE 39

6-ethyl-6-(m-methoxyphenyl)hexahydro-2H-azepin-2-one (a) A mixture of ethyl 5-cyano-5-(m-methoxyphenyl) heptanoate (16.0 g.), concentrated sulphuric acid (11.9 ml.) and palladium on charcoal catalyst (2.0 g.) in methanol (125 ml.) was hydrogenated at room temperature and 50 lbs./sq. inch pressure in a Parr hydrogenator. The catalyst was filtered off, washed with methanol, and the filtrate and washings combined and evaporated in vacuo. The residue was basified with 0.880 ammonia solution, extracted with ether, dried (MgSO₄) and evaporated to give 15.2 g. of 5-aminomethyl-5-(m-methoxyphenyl) heptanoate.

(b) The above amino-ester was heated under reflux in toluene (200 ml.) for 24 hours, the liberated ethanol/toluene azeotrope removed by distillation up a suitable column. The excess of toluene was evaporated in vacuo and the residue crystallised from a mixture of ethyl acetate and petroleum ether (B.P. 60–80° C.) to give 8.05 g. of the title compound, M.P. 87–89° C.

This compound has also been prepared by a one step reduction and cyclisation at high temperature, without isolating the intermediate aminomethyl ester of part (a) of this example. Details for the one step process are given in Example 19(b).

EXAMPLE 40

3-(m-methoxyphenyl)-3-ethyl-hexahydroazepine (by catalytic reduction)

(a) 2-(m-methoxyphenyl)butyronitrile (70 g.) was added dropwise to a stirred suspension of sodium amide (18 g.) in dry toluene (160 ml.) at 70° C. On completion of the addition the mixture was stirred at 80° C. for 1 hour. Anhydrous tetrahydrofuran (20 ml.) was added to make the solution homogeneous, cooled and added slowly over a period of 2 hours to a stirred slution of 1-bromo-4-chlorobutane (72 g.) in toluene (200 ml.) at 10–15° C. The reaction mixture was allowed to warm up to room temperature then left overnight. Water (100 ml.) was added, the organic layer separated and washed with dilute acid, dried over magnesium sulphate and distilled affording 69.5 g. of colourless oil B.P. (0.005 mm.) 150–151° C.

(b) The chloronitrile of part (a) above (13.2 g.) was hydrogenated at an initial pressure of 50 p.s.i. in the presence of methanol (100 ml.) containing concentrated sulphuric acid (75 ml.) and palladium-on-charcoal (10%, 3 g.). Uptake of hydrogen ceased when 1 mole of hydrogen had been absorbed. The catalyst was filtered off and replaced with a fresh portion (3 g.) and more concentrated sulphuric acid (5 ml.). A further mole of hydrogen was absorbed. After the catalyst had been removed and the methanol evaporated under reduced pressure, the product was dissolved in water, made basic with concentrated ammonia solution and extracted with ether and dried. Evaporation yielded 14 g. of oil. The product was dissolved in 2 N hydrochloric acid and added dropwise to 1 N sodium hydroxide solution (4 l.) at 50° C. The temperature was raised over 2 hours to 100° C. and the mixture heated at 100° for 3 hours. The reaction mixture was cooled, concentrated to 1 l. and extracted with ether. The basic material was isolated by an acid-base extraction of the ether solution and distilled affording 3.7 g. of colourless oil, B.P. (0.05 mm.) 112–120° C. The hydrobromide was obtained in the usual way and was identical to that of Example 19(c).

EXAMPLE 41

3-(m-benzyloxyphenyl)-3-ethyl-hexahydro-1H-azepine

The phenol (1 equivalent) of Example 20 in dry dimethyl formamide was added to a suspension of sodium hydride (1 equivalent of a 50% dispersion in oil) in the same solvent. When evolution of hydrogen had ceased, benzylchloride (1 equivalent) was added to the stirred solution keeping the temperature between 5–10° C. by cooling. On completion of the addition the product was obtained by pouring into water, extracting with benzene and either distilling the product or converting to the required salt.

EXAMPLE 42

(−)-3-ethyl-3-(m-hydroxyphenyl)hexahydro-1H-azepine (a) A solution of (±)-3-ethyl-3-(m-hydroxyphenyl)hexahydro-1H-azepine (172 g.) in ethanol (1 litre) was treated with a solution of D(+)-tartaric acid (118 g.) in ethanol. The excess of alcohol was evaporated off, the residue treated with iso-propanol, cooled, the precipitate filtered off and purified to constant optical rotation by repeated recrystallisation from ethanol. The D(+)-tartrate salt (48.2 g.) of the title compound had M.P. 171–172° C., $[\alpha]_D^{24}$ −28.9° (C=2% in dimethylformamide).

(b) The above salt (10.8 g.) was dissolved in water, basified with 0.880 ammonium hydroxide solution and extracted with ether. The organic extract was washed with sodium hydrogen carbonate solution and water, dried, evaporated and the oily residue distilled in vacuo to give 6.5 g. of the title compound, $[\alpha]_D^{24}$ −62.2° (C=2% in chloroform). (Found: C, 76.5; H, 9.9; N, 6.3. $C_{14}H_{21}NO$ requires C, 77.2; H, 9.9; N, 6.0%.)

The material D(+)-tartaric acid refers to the natural material generally sold under this description. It has in fact the laevo configuration (see Merck Index, 8th edition, 1968, p. 1014).

EXAMPLE 43

(+)-3-ethyl-3-(m-hydroxyphenyl)hexahydro-1H-azepine (a) The iso-propanol mother liquors obtained after removal of the D(+)-tartrate of the (−)-hexahydroazepine of Example 42, were evaporated to dryness, the oily residue dissolved in water and then basified by addition of 2 N sodium carbonate solution. The mixture was then extracted with benzene, the extract washed with water, dried (MgSO₄) and evaporated to leave an oily residue. Dissolution of this oil in ethanol, treatment with L(−)-tartaric acid, evaporation of the ethanol and treatment of the residue with iso-propanol gave the L(−)-tartrate salt (43.5 g.) of the title compound, M.P. 171–172° C. $[\alpha]_D^{24}$ +29.1° (C=2% in dimethylformamide).

(b) The above salt (15.8 g.) was dissolved in water, basified with 0.880 ammonium hydroxide solution and extracted with ether. The organic extract was washed with sodium hydrogen carbonate solution and water, dried, evaporated and the oily residue distilled in vacuo to give 8.1 g. of the title compound, $[\alpha]_D^{24}$ +65.6° (C=2% in chloroform). (Found: C, 77.4; H, 9.5; N, 5.9. $C_{14}H_{21}NO$ requires C, 77.2; H, 9.9; N, 6.0%.)

EXAMPLE 44

(−)-1-methyl-3-ethyl-3-(m-hydroxyphenyl)hexahydro-1H-azepine

A mixture of the product of Example 42 (3.2 g.), 10% palladium on charcoal (1.2 g.), 36% aqueous formaldehyde (3 ml.) and ethanol (100 ml.) was shaken in an atmosphere of hydrogen at an initial pressure of 50 p.s.i. The theoretical quantity of hydrogen was absorbed in 10 minutes, after which the mixture was filtered and the filtrate evaporated to dryness. The residual oil was dissolved in iso-propanol and treated with ethereal hydrogen chloride to give 1.82 g. of the hydrochloride of the title compound, M.P. 214–216° C. and $[\alpha]_D^{24}$ −9° (C=2% in water) after recrystallisation from ethanol. (Found: C, 66.9; H, 9.1; N, 5.2. $C_{15}H_{23}NO \cdot HCl$ requires C, 66.8; H, 9.3; N, 5.2%.)

EXAMPLE 45

(+)-1-methyl-3-ethyl-3-(m-hydroxyphenyl)hexahydro-1H-azepine

A mixture of the product of Example 43 (2.0 g.), 10% palladium on charcoal (1.0 g.) 40% aqueous formaldehyde (2.0 ml.) and ethanol (100 ml.) was shaken in an atmosphere of hydrogen at an initial pressure of 50 p.s.i. The theoretical quantity of hydrogen was absorbed in 10 minutes, after which the mixture was filtered, and the filtrate evaporated to dryness. On re-evaporation with 50 ml. of benzene, the residue crystallised. Recrystallisation from benzene gave 0.95 g. of the title compound, M.P. 130–131° C., $[\alpha]_D^{24}$ +24° (C=1.9% in chloroform). (Found: C, 77.6; H, 10.1; N, 5.9. $C_{15}H_{23}NO$ requires C, 77.2; H, 9.9; N, 6.0%.)

Treatment of a solution of the above base in iso-propanol with ethereal hydrogen chloride, gave the hydrochloride of the title compound, which atfer recrystallisation from a mixture of ethanol and ether had M.P. 213–215° C. and $[\alpha]_D^{24}$ +9° (C=2% in water). (Found: C, 66.5; H, 9.25; N, 5.0. $C_{15}H_{23}NO \cdot HCl$ requires C, 66.8; H, 9.3; N, 5.2%.)

EXAMPLE 46

(−)-1-allyl-3-ethyl-3-(m-hydroxyphenyl)hexahydro-1H-azepine

A mixture of the product of Example 42 (3.0 g.), potassium carbonate (2.0 g.) and allyl bromide (2.1 g.) in methyl ethyl ketone (75 ml.) was stirred and heated under reflux for 24 hours. The mixture was then cooled, filtered and evaporated under reduced pressure to give an oily residue which was distilled in vacuo (B.P. 140–160° C./4.0×10⁻⁵ mm.) and the distillate crystallised from a mixture of benzene and petroleum ether (B.P. 40–60° C.) to give the title compound, 1.2 g., M.P. 69–70° C. and $[\alpha]_D^{24}$ −33.2 (C=2% in chloroform). (Found: C, 78.6; H, 9.7; N, 5.5. $C_{17}H_{25}NO$ requires C, 78.7; H, 9.7; N, 5.4%.)

EXAMPLE 47

(+)-1-allyl-3-ethyl-3-(m-hydroxyphenyl)hexahydro-1H-azepine

A mixture of the product of Example 43 (3.0 g.), potassium carbonate (2.0 g.) and allyl bromide (2.1 g.) in methyl ethyl ketone (75.0 ml.) was stirred and heated under reflux for 12 hours. The mixture was then cooled, filtered and evaporated under reduced pressure to give an oily residue which was distilled in vacuo (B.P. 140–150° C./5.0×10⁻⁴ mm.) and the distillate crystallised from a mixture of benzene and petroleum ether (B.P. 40–60° C.) to give the title compound, 2.0 g., M.P. 70.0–70.5° C. and $[\alpha]_D^{24}$ +33.3 (C=2.4% in chloroform). (Found: C, 78.8; H, 9.8; N, 5.3. $C_{17}H_{25}NO$ requires C, 78.7; H, 9.7; N, 5.4%.)

EXAMPLE 48

(−)-3-ethyl-3-(m-hydroxyphenyl)-1-(prop-2-ynyl)hexahydro-1H-azepine

A mixture of the product of Example 42 (3.0 g.) potassium carbonate (2.0 g.) and 3-bromoprop-1-yne (2.1 g.) in dry dimethylformamide was stirred at room temperature for 24 hours. The mixture was then cooled, filtered, the filtrate evaporated to dryness under reduced pressure and the residual oil distilled in vacuo (B.P. 160–180° C./4.0×10⁻⁵ mm.) to give the title compound, 0.8 g., $[\alpha]_D^{24}$ −33.3° (C=2.4% in chloroform). (Found: C, 80.0; H, 9.0; N, 5.2. $C_{17}H_{23}NO$ requires C, 79.3; H, 9.0; N, 5.4%.)

EXAMPLE 49

(+)-3-ethyl-3-(m-hydroxyphenyl)-1-(prop-2-ynyl)hexahydro-1H-azepine

A mixture of the product of Example 43 (3.5 g.), potassium carbonate (2.5 g.) and 3-bromoprop-1-yne (2.5 g.) in dry dimethylformamide was stirred at room temperature for 24 hours. The mixture was then cooled, filtered, the filtrate evaporated to dryness under reduced pressure and the residual oil distilled in vacuo (B.P. 160–180° C./5.0×10$^{-5}$ mm.) to give 2.5 g. of the title compound, $[\alpha]_D^{24}$ +33.3° (C=2.4% in chloroform). (Found: C, 79.5; H, 9.0; N, 5.4. $C_{17}H_{23}NO$ requires C, 79.3; H, 9.0; N, 5.4%.)

EXAMPLE 50

(−)-3-ethyl-3-(m-hydroxyphenyl)-1-(2-methylbut-2-enyl)hexahydro-1H-azepine

A mixture of the product of Example 42 (3.0 g.), potassium carbonate (2.0 g.) and 1-chloro-3-methylbut-2-ene (2.2 g.) in methyl ethyl ketone (100 ml.) was stirred and heated at 80° C. for 14 hours. The cooled mixture was then filtered, the filtrate evaporated to dryness under reduced pressure and the residual oil distilled in vacuo (B.P. 180° C./5×10$^{-5}$ mm.) to give 2.2 g. of the title compound $[\alpha]_D^{24}$ −57.7° (C=2.4% in chloroform). (Found: C, 78.8; H, 10.2; N, 4.9. $C_{19}H_{29}NO$ requires C, 79.4; H, 10.2; N, 4.8%.)

EXAMPLE 51

(+)-3-ethyl-3-(m-hydroxyphenyl)-1-(2-methylbut-2-enyl)hexahydro-1H-azepine

A mixture of the product of Example 43 (2.19 g.), potassium carbonate (2.0 g.) and 1-chloro-3-methylbut-2-ene (1.05 g.) in methyl ethyl ketone (50 ml.) was stirred and heated under reflux for 20 hours. The cooled mixture was then filtered, the filtrate evapoarted to dryness, the residue dissolved in 2 N hydrochloric acid and washed with benzene. The acidic aqueous solution was basified by addition of 2 N sodium hydroxide solution, extracted with ether and dried extract evaporated to give a residual oil which was distilled in vacuo (B.P. 240–245° C./5.42×10$^{-5}$ mm.) to give 1.76 g. of the title compound, $[\alpha]_D^{24}$ +54° (C=2% in chloroform). (Found: C, 79.7; H, 10.4; N, 5.1. $C_{19}H_{29}NO$ requires C, 79.4; H, 10.2; N, 4.8%.)

EXAMPLE 52

(−)-1-cyclopropylmethyl-3-ethyl-3-(m-hydroxyphenyl)hexahydro-1H-azepine (a) A solution of the product of Example 42 (2.19 g.) and triethylamine (1.05 g.) in chloroform was treated dropwise with cyclopropane carboxylic acid chloride (1.06 g.) whilst keeping the temperature below 20° C. The reaction mixture was then stirred at room temperature overnight, poured into water, the organic layer separated and washed with dilute hydrochloric acid and water. Evaporation of the dried chloroform solution gave 3.15 g. of the oily (−)-1cyclopropylcarbonyl-3-ethyl-3-(m-hydroxyphenyl)hexahydro-1H-azepine.

(b) A solution of the above oil (3.15 g.) in dry ether was added to a stirred suspension of aluminium lithium hydride (1.6 g.) in ether (50 ml.) and then heated under reflux for 4 hours. The mixture was then cooled and the complex decomposed by addition of water (2 ml.), 2 N sodium hydroxide (4 ml.) and the precipitated inorganic material filtered off. Evaporation of the filtrate and recrystallisation of the residue from benzene gave 1.75 g. of the title compound, M.P. 115–116° C. and $[\alpha]_D^{24}$ −34.7° (C=2% in chloroform). (Found: C, 79.5; H, 10.2; N, 5.2. $C_{18}H_{27}NO$ requires C, 79.1; H, 10.0; N, 5.1%.)

EXAMPLE 53

(+)-1-cyclopropylmethyl-3-ethyl-3-(m-hydroxyphenyl)hexahydro-1H-azepine (a) A solution of the product of Example 43 (3.5 g.) and triethylamine (1.63 g.) in chloroform (40 ml.) was treated dropwise with cyclopropane carboxylic acid chloride (1.68 g.) whilst keeping the temperature below 10° C. The reaction mixture was then stirred at room temperature for 2 hours, poured into water, the organic layer separated and washed with dilute hydrochloric acid and water. Evaporation of the dried chloroform solution gave 4.3 g. of the oily (+)-1-cyclopropylcarbonyl-3-ethyl-3-(m-hydroxyphenyl)hexahydro-1H-azepine.

(b) A solution of the above oil (4.3 g.) in dry ether (80 ml.) was added dropwise to a stirred suspension of aluminium lithium hydride (2.0 g.) in ether (50 ml.) and then heated under reflux for 2 hours. The mixture was then cooled and the complex decomposed by addition of water (2.0 ml.), 2 N sodiumhydroxide (4.0 ml.) and the precipitated inorganic material filtered off. Evaporation of the filtrate and recrystallisation of the residue from benzene gave 1.3 g. of the title compound, M.P. 117–118° C. and $[\alpha]_D^{24}$ +33° (C=1% in chloroform). (Found: C, 79.4; H, 10.1; N, 5.1. $C_{18}H_{27}NO$ requires C, 79.1; H, 10.0; N, 5.1%.)

EXAMPLE 54

(−)-3-ethyl-3-(m-hydroxyphenyl)-1-(n-propyl)hexahydro-1H-azepine

The reaction of 3.0 g. of the product of Example 42 with propyl bromide in acetone containing potassium carbonate according to the method of Example 46 gave the title compound (B.P. 200–210° C./1.0×10$^{-4}$ mm.), $[\alpha]_D^{24}$ −38° (C=2% in chloroform). The product was crystallised from benzene petroleum ether (B.P. 60–80° C. to give colourless rhombs, 0.9 g., M.P. 82–83° C., $[\alpha]_D^{24}$ −38° (C=2% in chloroform). (Found: C, 78.45; H, 10.4; N, 5.5. $C_{17}H_{27}NO$ requires C, 78.1; H, 10.4; N, 5.4%.)

EXAMPLE 55

(+)-3-ethyl-3-(m-hydroxyphenyl)-1-(n-propyl)hexahydro-1H-azepine

The reaction of 3.0 g. of the product of Example 43 with propyl bromide in acetone containing potassium carbonate according to the method of Example 46, gave the title compound (B.P. 190–200° C./1.0×10$^{-4}$ mm.), $[\alpha]_D^{24}$ +40° (C=2% in chloroform).

The product was recrystallised from benzene-petroleum ether (B.P. 60–80° C.) to give 0.9 g., M.P. 82–83° C., $[\alpha]_D^{24}$ +38° (C=2% in chloroform). (Found: C, 78.5; H, 10.6; N, 5.5. $C_{17}H_{27}NO$ requires C, 78.1; H, 10.4; N, 5.4%.)

EXAMPLE 56

(−)-1-cyclopropylmethyl-3ethyl-3-(m-acetoxyphenyl)hexahydro-1H-azepine

Acetylchloride (0.01 mole) was added dropwise at 10–15° C. to a stirred solution of (−)-1-cyclopropylmethyl-3-ethyl-3-(m-hydroxyphenyl)hexahydro-1H-azepine in methylenedichloride (50 ml.) and triethylamine (2 ml.). The reaction mixture was allowed to warm up to room temperature and left overnight. After pouring into water the organic layer was separated, washed with water, then dried over anhydrous magnesium sulphate. The solvent was removed under reduced pressure and the oil converted to the hydrochloride by dissolving in acetone and treating with a solution of hydrogen chloride in dry ether. The hydrochloride was obtained as colourless rhombs, 1.25 g., M.P. 164–166° C., $[\alpha]_D^{24}$ −28° (C=2% in water). (Found: C, 68.5; H, 8.7; N, 4.1. $C_{20}H_{29}NO_2HCl$ requires C, 68.2; H, 8.6; N, 4.0%.)

EXAMPLE 57

1-cyclopropylmethyl-3-ethyl-3-(m-hydroxyphenyl)hexahydro-1H-azepine

Cyclopropanecarboxylic acid chloride (2.42 g.) was added dropwise to a stirred solution of 3-ethyl-3-(m-hydroxyphenyl)hexahydro-1H-azepine (5 g.) in chloroform (70 ml.) and triethylamine (5 ml.) while the temperature was kept below 20°. On completion of the addition the reaction mixture was stirred at room temperature for 3 hours. The reaction mixture was poured into water, the organic layer separated and washed with dilute hydrochloric acid. After drying over anhydrous magnesium sulphate the solvent was removed to leave a residue which crystallised on triturating with ether, 5.5 g. M.P. 129–131° C. (Found: C, 75.1; H, 8.8; N, 4.8. $C_{18}H_{25}NO_2$ requires C, 75.25; H, 8.8; N, 4.9%.)

The amide prepared above (4.0 g.) in anhydrous T.H.F. was added to a stirred suspension of lithium aluminium hydride (1.1 g.) in anhydrous ether (70 ml.). On completion of the addition the mixture was heated under reflux for 3 hours, cooled and successively water (1 ml.), 2 N sodium hydroxide (2 ml.) and water (2 ml.) were added. The inorganic material was filtered off and the solvent removed to leave a colourless oil. The oil was dissolved in isopropanol and an equimolar quantity of racemic tartaric acid added, the tartrate was obtained as colourless rhombs, 1.0 g. M.P. 150–152° C. (Found: C, 62.1; H, 7.9; N, 3.1. $C_{18}H_{25}NOC_4H_6O_6$ requires C, 62.4; H, 7.5; N, 3.3%.)

EXAMPLE 58

3-ethyl-3-(m-hydroxyphenyl)-1-(prop-2-ynyl) hexahydro-1H-azepine 3-ethyl-3-(m-hydroxyphenyl)hexahydro - 1H - azepine (5.0 g.), 3-bromo-1-propyne (3.04 g.) and anhydrous potassium carbonate (3.45 g.) in dry dimethylformamide (80 ml.) were stirred together at room temperature for 24 hours. The solid material was filtered off and the dimethylformamide removed under reduced pressure. The remaining material was dissolved in 2 N hydrochloric acid and extracted with ether. The aqueous layer was basified and reextracted with ether. After drying over anhydrous magnesium sulphate the solvent was removed under reduced pressure and the residue distilled affording a colourless glass, 3.9 g., B.P. (bath temp.) 240–260° at 0.01 mm. (Found: C, 80.0; H, 9.1; N, 5.3. $C_{17}H_{23}NO$ requires C, 79.3; H, 9.0; N, 5.4%.)

EXAMPLE 59

3-ethyl-3-(m-hydroxyphenyl)-1-(n-propyl) hexahydro-1H-azepine 3-ethyl-3-(m-hydroxyphenyl)hexahydro - 1H - azepine (2.15 g.), n-propyl bromide (1.35 g.), anhydrous potassium carbonate (2.0 g.) in a mixture of dry dimethylformamide (60 ml.) and dry T.H.F. (40 ml.) was heated under reflux for 14 hours. After removal of the solid the reaction mixture was worked-up as described in the preceding experiment and the residue distilled yielding a colourless glass, 1.1 g., B.P. 200–220° at 0.01 mm. (Found: C, 78.4; H, 10.7; N, 5.1. $C_{17}H_{27}NO$ requires C, 78.1; H, 10.4, N, 5.54%.)

EXAMPLE 60

1-allyl-3-ethyl-3-(m-hydroxyphenyl)hexahydro-1H-azepine 3-ethyl-3-(m-hydroxyphenyl)hexahydro - 1H - azepine hydrobromide (6.0 g.), allylbromide (2.4 g.), anhydrous potassium carbonate (6.0 g.) and acetone (80 ml.) were heated under reflux for 14 hours. The potassium carbonate was filtered off and the acetone removed under reduced pressure. The residue was dissolved in acid and extracted with ether. The aqueous layer was basified with ammonia and the oil extracted into ether. After drying the solvent was removed under reduced pressure to leave an oil which was treated with an equivalent quantity of concentrated hydrobromic acid. After removing the water under reduced pressure the residue was crystallised from isopropanol-ether affording, 5.5 g., M.P. 168–169° C. (Found: C, 59.9; H, 7.8; N, 4.0. $C_{17}H_{25}NOHBr$ requires C, 60.15; H, 7.7; N, 4.1%.)

EXAMPLE 61

3-ethyl-3-(m-hydroxyphenyl)-1-(2-methylbut-2-enyl) hexahydro-1H-azepine 3-ethyl-3-(m-hydroxyphenyl)hexahydro - 1H - azepine hydrobromide, 1-chloro-3-methyl-2-butene (1.82 g.) anhydrous potassium carbonate (2.5 g.), sodium iodide (0.1 g.) and methyl ethyl ketone (160 ml.) were heated under reflux with stirring for 14 hours. The solid was filtered off and the organic layer was evaporated to an oil under reduced pressure. The residue was dissolved in 2 N HCl and extracted with ether. The aqueous layer was basified and the basic material isolated by extracting with ether. After drying over magnesium sulphate the solvent was removed and the product distilled affording a colourless oil, 2.3 g., B.P. 180–190° at 0.01 mm. (Found: C, 79.1; H, 10.1; N, 5.2. $C_{19}H_{29}NO$ requires C, 79.4; H, 10.2; N, 4.9%.)

EXAMPLE 62

| | Mg. |
|---|---|
| 3 - ethyl - 3 - (m - hydroxyphenyl)hexahydro-1H-azepine | 30 |
| Lactose | 120 |
| Magnesium stearate | 5 |

Capsules of the above were made up by thoroughly mixing together batches of the above ingredients and filling hard gelatine capsules (155 mg.) with the mixture.

EXAMPLE 63

| | Mg. |
|---|---|
| 3 - ethyl - 3 - (m - hydroxyphenyl)hexahydro-1H-azepine | 30 |
| Lactose | 100 |
| Avicel | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components and compressing to form tablets.

EXAMPLE 64

| | Mg. |
|---|---|
| (−)-1-cyclopropylmethyl - 3 - ethyl-3-(m-hydroxyphenyl)hexahydro-1H-azepine | 15 |
| Lactose | 120 |
| Magnesium stearate | 5 |

Capsules of the above were made up by thoroughly mixing together batches of the above ingredients and filling hard gelatine capsules (155 mg.) with the mixture.

EXAMPLE 65

| | Mg. |
|---|---|
| (−)-1-cyclopropylmethyl - 3 - ethyl-3-(m-hydroxyphenyl)hexahydro-1H-azepine | 20 |
| Lactose | 100 |
| Avicel (microcrystalline cellulose) | 30 |
| Dried maize starch | 40 |
| Magnesium stearate | 5 |

Tablets of the above composition were made by milling the active ingredient to 40 mesh (British Standard), sieving through a 40 mesh (British Standard) sieve, mixing the milled material with the other components and compressing to form tablets.

As above indicated, the new compounds of this invention display analgesic activity as shown by standard tests in laboratory animals. Many show analgesic activity comparable to that of codeine phosphate, and appear to be non-addicting and free of certain undesirable side-effects frequently encountered in analgesics, such as tendency to cause convulsions and/or constipation.

The following tables summarise some of the pharmacological testing we have had conducted. Compounds were screened as to analgesic activity by a modification of the Rat Tail Flick of D'Amour and Smith, J. Pharm. 72:74, 1941. Test material was administered subcutaneously at a dosage level of 25 mg./kg. and analgesia in the animals was determined as a percentage of the total possible analgesia in the animals was determined as a percentage of the total possible analgesia that could appear in the experimental period.

TABLE I

| Test material | Percentage of total possible analgesia | | | | |
|---|---|---|---|---|---|
| | 20–30 | 30–40 | 40–50 | 50–60 | >60 |
| Codeine phosphate | | | | | X |
| Product of Example: | | | | | |
| 1(e) | | X | | | |
| 2 (HBr salt) | | | | | X |
| 2 (base) | | | | | X |
| 5 | | X | X | | |
| 6 | | | X | | |
| 8 | | | | | X |
| 10 | | | | X | |
| 11 | | | | | X |
| 15 | | X | | | |
| 16 | | X | | | |
| 18 | | | | X | |
| 20 | | | | | X |
| 21(a) | | | | X | |
| 21(b) | | | | X | |
| 22 | | | | | X |
| 23 | | | X | | |
| 24 | | | | X | |
| 25 | | | | X | |
| 26 | | X | | | |
| 27 | | | X | | |
| 28 | | X | | | |
| 29 | | | | | X |
| 31 | | | | X | |
| 33 | | X | | | |
| 34 | | | | | X |
| 38 | X | | | | |

Ethoheptazine in the above mentioned test, at a dosage level of 100 mpk. subcutaneously gives a value of 15% of total possible analgesia.

Table II compares the median analgesic dose (AD$_{50}$), the median convulsant dose (CD$_{50}$) and the median lethal dose (LD$_{50}$) of certain compounds of this invention with the corresponding values for codeine phosphate and d-propoxyphene hydrochloride. In these tests, the test materials were administered intraperitoneally in mice.

TABLE II

| Test material | AD$_{50}$ | CD$_{50}$ | LD$_{50}$ | CD$_{50}$/AD$_{50}$ | LD$_{50}$/AD$_{50}$ |
|---|---|---|---|---|---|
| Codeine phosphate | 25.5 | 112 | 127 | 4.39 | 4.98 |
| d-Propoxyphene hydrochloride | 45.5 | 120 | 190 | 2.64 | 4.18 |
| Product of Example: | | | | | |
| 2 | 25.5 | 28 | 95 | 1.10 | 3.73 |
| 8 | 22.8 | 53 | 150 | 2.32 | 6.58 |
| 10 | 24.3 | 100 | 105 | 4.12 | 4.32 |
| 20 | 15.92 | (¹) | 61.25 | (¹) | 3.85 |
| 22 | 37 | (¹) | 140 | (¹) | 3.78 |
| 24 | 40.1 | 50.4 | 127.3 | 1.26 | 3.18 |
| 29 | 14.0 | (¹) | 70 | (¹) | 5.0 |
| 34 | 12.0 | 70.9 | 70.0 | 5.8 | 5.8 |

¹ No sign of convulsant properties.

A somewhat similar comparison of the analgesic and toxic properties of these compounds on the basis of oral administration to mice is shown in Table III.

TABLE III

| Test material | AD$_5$ | CD$_5$ | LD$_5$ | CD$_{50}$/AD$_{50}$ | LD$_{50}$/AD$_{50}$ |
|---|---|---|---|---|---|
| Codiene phosphate | 54 | 410 | 410 | 7.59 | 7.59 |
| d-Propoxyphene hydrochloride | 125 | | 285 | 2.28 | 2.28 |
| Product of Example: | | | | | |
| 2 | 88 | 220 | 560 | 2.50 | 6.36 |
| 8 | 65 | 240 | 530 | 3.69 | 8.15 |
| 10 | 125 | 540 | 540 | 4.32 | 4.32 |
| 20 | 31.11 | (¹) | 142.9 | (¹) | 4.59 |
| 22 | 68 | (¹) | 600 | (¹) | 8.82 |
| 24 | 160.3 | 254.6 | >360 | 1.59 | >2.24 |

¹ No sign of convulsant properties.

It will be evident from the foregoing tables that compounds of this invention show very strong analgesic properties, and that in several, at least, the analgesic effect is attained at a dosage much lower than the lethal or convulsive doses.

It has been found that the compounds of Examples 5, 6, 16, 26, 27, 28 and 34 also exhibit morphine antagonism activity; this is a strong indication that such compounds will prove to be non-addicting.

It has long been known that many analgesics, e.g. codeine, have a constipating effect, and this is ordinarily rather undesirable. We have conducted tests of a number of compounds of this invention by two methods to appraise this effect. Reduction in the number of faeces voided by individual rats after dosing with the compounds of the invention was taken as a measure of constipating action. An alternative method employed has been determination of the rate of travel of an inert coloured substance (charcoal) along the small intestine following dosage with test compound. In all such tests we have conducted, the new compounds of this invention appear to be less constipating than codeine.

In addition to the above test results it has also been found that the compounds of Examples 45, 47, 49, 51 and 53 which are all dextro-enantiomers antagonise some or all of the symptoms of heavy morphinisation in rats such as respiratory depression, inhibition of corneal reflex, muscle rigidity and decreased motor activity. In addition, the compounds of Examples 44, 46, 48 and 52 (all laevo-enantiomers) possess a greater analgesic activity than the corresponding dextro-enantiomers (Examples 45, 47, 49 and 51).

The compounds of Examples 44, 45, 46 and 52 all showed greater activity than pentazocine in an antiwrithing test in mice (Proc. Soc. Exp. Biol. Med., 95, (1957), 729–31). This is a measure of potent analgesic activity.

What is claimed is:

1. A compound selected from the group consisting of compounds of the formula:

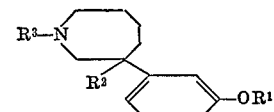

wherein R¹ is hydrogen or a lower alkanoyl radical, R² is an ethyl radical and wherein R³ is a lower alkyl, lower alkenyl, lower alkynyl or cyclopropylmethyl radical and the acid addition salts thereof with pharmaceutically acceptable acids.

2. The laevorotatory isomers of the compounds claimed in claim 1.

3. A compound according to claim 1 which is 1-alkyl-3 - ethyl - 3 - (m-hydroxyphenyl)hexahydro-1H-azepine or an acid addition salt thereof with a pharmaceutically acceptable acid.

4. A compound according to claim 1 which is 3-ethyl-3 - (m - hydroxyphenyl)-1-methylhexahydro-1H-azepine or an acid addition salt thereof with a pharmaceutically acceptable acid.

5. A compound as claimed in claim 1, which is 1-cyclopropylmethyl - 3 - ethyl - 3 - (m-hydroxyphenyl)-hexahydro-1H-azepine or an acid addition salt thereof with a pharmaceutically acceptable acid.

6. A compound as claimed in claim 1 which is 1, which is 1 - cyclopropylmethyl - 3 - ethyl-3-(m-acetoxyphenyl)-hexahydro-1H-azepine or an acid addition salt thereof with a pharmaceutically acceptable acid.

References Cited
UNITED STATES PATENTS
| | | | |
|---|---|---|---|
| 2,892,842 | 6/1959 | McElvain | 260—294.7 |
| 2,740,780 | 4/1956 | Diamond et al. | 260—239 |
| 2,775,589 | 12/1956 | Diamond et al. | 260—239 |

OTHER REFERENCES
Burger: Medicinal Chemistry (second edition, New York, 1960), pp. 321–331.

ALTON D. ROLLINS, Primary Examiner

U.S. Cl. X.R.

260—239 BE, 239 BF, 239.3 R, 326 A, 465 D, 465 F, 471 A, 473 R, 519, 566 R, 570.5 R; 424—244